United States Patent
Keivaan et al.

(10) Patent No.: US 12,368,494 B2
(45) Date of Patent: Jul. 22, 2025

(54) METHOD AND APPARATUS FOR WIRELESS TRANSMISSION, RECEPTION AND RELATED OPERATIONS USING RECONFIGURABLE MATRIX OF ELEMENTS

(71) Applicants: Huawei Technologies Canada Co., Ltd., Kanata (CA); la Corporation de l'École Polytechnique de Montréal, Montréal (CA)

(72) Inventors: Seyed Ali Keivaan, Montreal (CA); Pascal Burasa, Montreal (CA); Ke Wu, Montreal (CA)

(73) Assignees: HUAWEI TECHNOLOGIES CANADA CO., LTD., Kanata (CA); la Corporation de l'École Polytechnique de Montréal, Montreal (CA)

( * ) Notice: Subject to any disclaimer, the term of this patent is extended or adjusted under 35 U.S.C. 154(b) by 0 days.

(21) Appl. No.: 18/390,681

(22) Filed: Dec. 20, 2023

(65) Prior Publication Data

US 2025/0211316 A1 Jun. 26, 2025

(51) Int. Cl.
*H04L 5/12* (2006.01)
*H04B 7/06* (2006.01)
*H04B 7/08* (2006.01)

(52) U.S. Cl.
CPC ......... *H04B 7/0802* (2013.01); *H04B 7/0608* (2013.01)

(58) Field of Classification Search
CPC .................... H04B 7/0802; H04B 7/0608
USPC ............... 375/262, 260, 259, 219, 295, 316
See application file for complete search history.

(56) References Cited

U.S. PATENT DOCUMENTS

2024/0414684 A1* 12/2024 Singh .................... G01S 5/0247

FOREIGN PATENT DOCUMENTS

WO 2024/031168 A1 2/2024

OTHER PUBLICATIONS

D. McClearnon, and D. Dingee, "Enhancing Sub-Terahertz RF EDA Workflows for 6G Challenges," IEEE J. Microw., vol. 66, No. 7, pp. 20-28, Jul. 2023.

C. Rudell, V. Bhagavatula and W. C. Wesson, "Future integrated sensor radios for long-haul communication," in IEEE Commun. Mag., vol. 52, No. 4, pp. 101-109, Apr. 2014.

(Continued)

*Primary Examiner* — Zewdu A Kassa

(57) ABSTRACT

Methods and apparatus for wireless communication using a matrix of reconfigurable cells is provided. Each cell has an antenna or antenna port and is reconfigurable to operate as a transmitter, receiver, angle-of-arrival detector or power harvester. Cells can be allocated to different tasks as needed. A reference frequency signal is distributed to each cell, with an in-phase version of the signal being delivered to a first subset of cells, and a quadrature version of the signal being delivered to a second subset of cells. The first and second subsets may be interleaved for example in a checkerboard pattern. Cells cooperate in pairs for transmission or reception of quadrature amplitude modulated signals. Groups of four cells may cooperate for angle of arrival detection. The cells may be configured as interferometric transmitter/receiver cells using 90 degree hybrid couplers and power detectors.

20 Claims, 15 Drawing Sheets

(56) References Cited

OTHER PUBLICATIONS

S. Shinjo, K. Nakatani, K. Tsutsumi and H. Nakamizo, "Integrating the Front End: A Highly Integrated RF Front End for High-SHF Wide-Band Massive MIMO in 5G," in IEEE Microw. Mag., vol. 18, No. 5, pp. 31-40, Jul.-Aug. 2017.
J. Moghaddasi and K. Wu, "Multifunction, Multiband, and Multimode Wireless Receivers: A Path Toward the Future," in IEEE Microw. Mag., vol. 21, No. 12, pp. 104-125, Dec. 2020.
T. S. Rappaport, Y. Xing, G. R. MacCartney, A. F. Molisch, E. Mellios and J. Zhang, "Overview of Millimeter Wave Communications for Fifth-Generation (5G) Wireless Networks—With a Focus on Propagation Models," in IEEE Trans, Antennas Propag., vol. 65, No. 12, pp. 6213-6230, Dec. 2017.
M. A. Halimi, T. Khan, M. Palandoken, A. A. Kishk and Y. M. M. Antar, "Rectifier Design Challenges for Wireless Energy Harvesting/Wireless Power Transfer Systems: Broadening Bandwidth and Extended Input Power Range," in IEEE Microw. Mag., vol. 24, No. 6, pp. 54-67, Jun. 2023.
E. Westberg, J. Staudinger, J. Annes and V. Shilimkar, "5G Infrastructure RF Solutions: Challenges and Opportunities, "IEEE Microwave Magazine, vol. 20, No. 12, pp. 51-58, Dec. 2019.
T. Kawanishi, A. Kanno and H. S. C. Freire, "Wired and Wireless Links to Bridge Networks: Seamlessly Connecting Radio and Optical Technologies for 5G Networks," IEEE Microwave Magazine, vol. 19, No. 3, pp. 102-111, May 2018.
C. Wanget al., "Cellular architecture and key technologies for 5G wireless communication networks," IEEE Communications Magazine, vol. 52, No. 2, pp. 122-130, Feb. 2014.
Mqing Zhou, et al., "Service-aware 6G: An intelligent and open network based on the convergence of communication, computing and caching", Digital Communications and Networks, vol. 6, pp. 253-260, 2020.
J. Moghaddasi and K. Wu, "Multifunction, Multiband, and Multimode Wireless Receivers: A Path Toward the Future," IEEE Microwave Magazine, vol. 21, No. 12, pp. 104-125, Dec. 2020.
S. A. Keivaan, P. Burasa and K. Wu, "Virtual Receiver Matrix and Combinatory Analog Operations for Future Multifunction Reconfigurable Sensing and Communication Wireless Systems," inIEEE Transactions on Microwave Theory and Techniques, vol. 71, No. 1, pp. 424-433, Jan. 2023.

\* cited by examiner

METHOD AND APPARATUS FOR WIRELESS TRANSMISSION, RECEPTION AND RELATED OPERATIONS USING RECONFIGURABLE MATRIX OF ELEMENTS

CROSS-REFERENCE TO RELATED APPLICATIONS

This is the first application filed for the present invention.

FIELD OF THE INVENTION

The present invention pertains to wireless communications and related operations such as signal angle of arrival detection and power harvesting using wireless signals, and in particular to reconfigurable devices for performing such tasks.

BACKGROUND

Wireless communication technology has and continues to proliferate and evolve significantly, with one current milestone in such evolution being current advanced 5G systems. The upcoming 6G wireless communication system, in turn, is set to represent another significant step in the evolution. Some aspects of evolution and proliferation include increasing data rates, reduced latency, smart agility, ubiquitous connectivity, and robust service for an increased number of interconnected users and devices. Thanks to the continued scaling of low-power high-density transceivers, emerging wireless systems are expected to benefit from multiple radios and sensors cohabitating in an autonomous or semi-autonomous way. There is, accordingly, a need and potential for frequency-agile and standard-agile (protocol-agile) transceivers.

The successful implementation and widespread deployment of modern wireless communication platforms may require the fusion and interplay of multiple functionalities. For instance, Angle-of-Arrival (AoA) detection for unknown incoming sources and even point-to-point communication systems becomes important to robustly support a wireless link, as slight deviations may result in the quality and connectivity degradation of network. Moreover, RF-based wireless energy harvesting (WEH) has recently gained much attention due to its capability of powering various sensors and devices, which can be integrated into future transceiver architectures to further lower the burden of power consumption or to simply create battery-free networks. However, currently these different functionalities require different hardware within a device, leading to increased cost and complexity. Frequency, standard and protocol-agile transceivers can also be costly and complex. Power consumption is also a limiting factor and is related to such complexity.

Furthermore, in the above context, current millimeter-wave (mmW) and terahertz (THz) transceiver architectures are believed unlikely to be able to support the expected large number of connections in prospective future wireless systems. Therefore, significantly new designs are likely required to support wireless communication functionality in a smart, dense, and efficient manner with high capacity and speed.

Therefore, there is a need for methods, systems and apparatus for wireless communication and related operations, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Embodiments provide for methods, systems and apparatus for wireless communication and related operations, such as Angle-of-Arrival (AoA) detection and wireless energy harvesting (WEH). The wireless communication can involve transmission and reception of electromagnetic signals at given and typically high carrier frequencies such as microwave and mmW frequencies. In particular, a matrix of electronic elements, which is reconfigurable, is provided to support such operations. The matrix may be a two-dimensional (e.g. rectangular) array of elements disposed on a flat or curved surface.

Embodiments provide for a topological transceiver device that can implement multiple functions in a single transceiver architecture. By appropriately activating and using unit cells in the matrix of elements, different functions can be implemented, potentially with some functions being implemented concurrently. By using a configurable number of elements, power consumption and performance trade-offs can be implemented.

According to an aspect, there is provided an apparatus for transmitting and receiving wireless (e.g. radiofrequency, microwave or millimeter wave) signals. The apparatus includes a plurality of unit cells arranged in a two-dimensional array, and a reference frequency distribution component. Each of the unit cells has an antenna or an antenna port and is selectably reconfigurable to operate in one of a plurality of modes including: a wireless transmitter mode; and a wireless receiver mode. Other modes may also be included, as described below. The reference frequency distribution component is configured to distribute an electrical reference frequency signal to each of the unit cells, such that an in-phase version of the reference frequency signal is delivered to a first subset of the plurality of unit cells, and a quadrature version of the reference frequency signal is delivered to a second subset of the plurality of unit cells. The first subset and the second subset make up the plurality of unit cells. Each one of the unit cells belonging to the first subset and operating in the wireless transmitter mode cooperates with at least another one of the unit cells belonging to the second subset and operating in the wireless transmitter mode to transmit an outgoing wireless signal. Each one of the unit cells operating in the wireless receiver mode cooperates with at least another one of the unit cells operating in the wireless receiver mode to receive an incoming wireless signal.

In various embodiments the plurality of modes further includes a wireless signal angle of arrival (AoA) detector mode, where four or more of the unit cells operating in the wireless signal angle of arrival detector mode and belonging to a same one of the first subset and the second subset cooperate to determine a wireless signal angle of arrival. Additionally or alternatively, the plurality of modes may further include a wireless energy power harvesting mode, where unit cells operating in the wireless energy power harvesting mode convert received wireless signal energy at the antenna or antenna port into electrical energy usable for powering electrical components.

In some embodiments, the first subset forms a first two-dimensional pattern of unit cells, the second subset forms a second two-dimensional pattern of unit cells, and the first two-dimensional pattern and the second two-dimensional pattern are interleaved to form a checkerboard pattern within the two-dimensional array. In further embodiments, the four or more of the unit cells operating in the wireless signal angle of arrival detector mode form two parts of a zig-zag pattern within the checkerboard pattern, the two parts being symmetrically arranged about a reference cell separate from the four or more of the unit cells.

In various embodiments, each of the unit cells comprises at least one power detector (e.g. involving a Schottky diode), and each of the unit cells, when operating in the wireless energy harvesting mode, is configured to switchably or non-switchably engage a low pass filter with an output of said at least one power detector, where output of the low pass filter is routed as harvested power to a power sink or a power storage device.

In various embodiments, the apparatus includes a controller configured to allocate one or more groups of the plurality of unit cells to one or more corresponding transmission or reception tasks, and to configure unit cells of each of the groups to perform said corresponding transmission or reception tasks.

In some embodiments, for at least one of the groups, the controller determines a number of cells forming said at least one of the groups based on one or more of: a power consumption criterion; a performance criterion for a wireless transmission operation; and a performance criterion for a wireless reception operation.

In some embodiments, the controller determines a pattern of cells forming at least one of the groups based on one or more of: a polarization of the outgoing wireless signal or the incoming wireless signal; a frequency of the outgoing wireless signal or the incoming wireless signal; a direction for transmission of the outgoing wireless signal; and an angle of arrival of the incoming wireless signal.

In some embodiments, the plurality of modes further includes a wireless signal angle of arrival detector mode, and the angle of arrival of the incoming wireless signal is determined using the wireless signal angle of arrival detector mode operating prior to the controller determining the pattern of cells.

In some embodiments, the reference frequency distribution component includes one or more 90 degree hybrid couplers. Each of the 90 degree hybrid couplers is configured to receive the reference frequency signal and to generate a copy of the in-phase version of the reference frequency signal and a copy of the quadrature version of the reference frequency signal. The reference frequency distribution component is further configured to provide each of the unit cells of the first subset with one of the in-phase versions of the reference frequency signal, and to provide each of the unit cells of the second subset with one of the quadrature versions of the reference frequency signal.

In some embodiments, the one or more 90 degree hybrid couplers includes multiple 90 degree hybrid couplers, and the apparatus further includes a power divider configured to distribute the reference frequency signal to the multiple 90 degree hybrid couplers.

In some embodiments, each one of the unit cells belonging to the first subset is adjacent to at least one of the unit cells belonging to the second subset.

In some embodiments, the first subset forms a first two-dimensional pattern of unit cells, the second subset forms a second two-dimensional pattern of unit cells, and the first two-dimensional pattern and the second two-dimensional pattern are interleaved to form an overall pattern within the two-dimensional array. The overall pattern may be a checkerboard pattern.

In some embodiments, the outgoing wireless signal is a quadrature amplitude modulated signal, the above-mentioned one of the unit cells belonging to the first subset and operating in the wireless transmitter mode transmits an in-phase portion of the quadrature amplitude modulated signal, and the above-mentioned another one of the unit cells belonging to the second subset and operating in the wireless transmitter mode transmits a quadrature portion of the quadrature amplitude modulated signal. This one of the unit cells may be physically adjacent to this another one of the unit cells within the two-dimensional array.

In some embodiments, the incoming wireless signal is a quadrature amplitude modulated signal, the one of the unit cells operating in the wireless receiver provides an intermediate signal indicative of an in-phase portion of the quadrature amplitude modulated signal, and the another of the unit cells operating in the wireless receiver mode provides an intermediate signal indicative of a quadrature portion of the quadrature amplitude modulated signal.

In some further embodiments, this one of the unit cells is spaced apart from this another one of the unit cells by a distance which depends at least in part on an angle of arrival of the incoming wireless signal and an operating wavelength of the incoming wireless signal.

In some further embodiments, this one of the unit cells is spaced apart from this another one of the unit cells by a distance which depends at least in part on whether or not said one of the unit cells and said another one of the unit cells belong to a same subset, being one of the first subset and the second subset.

In some embodiments, each cell of the plurality of unit cells has an interferometric configuration, and includes a local oscillator, an antenna or antenna port, an intermediate frequency signal port, a pair of power detectors, and a 90 degree hybrid coupler. Impedance matching circuitry may also be included. The local oscillator is synchronized to the reference frequency signal as received by the cell. The antenna is configured for transmitting or receiving a wireless signal. The intermediate frequency signal port is configured for providing, to the cell, an intermediate frequency signal for use in generating the outgoing wireless signal for transmission or for outputting the intermediate frequency signal as derived from the incoming wireless signal. The pair of power detectors are operatively coupled to the intermediate frequency signal port. The 90 degree hybrid coupler has four terminals. A first terminal and a second terminal are each coupled to one of the pair of power detectors such that the power detectors are coupled between the intermediate frequency signal port and the 90 degree hybrid coupler. The first terminal and the second terminal are out of phase with respect to one another. The third terminal is coupled to the local oscillator. The fourth terminal is coupled to the antenna or the antenna port.

In some embodiments, each cell of the plurality of unit cells, when operating in the wireless transmitter mode, is configured to: receive the intermediate frequency signal at the intermediate frequency signal port; (e.g. differentially) drive the pair of power detectors according to the intermediate frequency signal; provide, to the antenna or the antenna port, the wireless signal for transmission based on outputs of the pair of power detectors and output of the local oscillator, as combined using the 90 degree hybrid coupler, said combining including mixing of the intermediate frequency signal with the reference frequency signal.

In some embodiments, each cell of the plurality of unit cells, when operating in the wireless receiver mode, is configured to: allow voltages at a hybrid coupler side of the pair of power detectors to fluctuate in response to the output of the local oscillator in combination with the received wireless signal, the combination being due to operation of the 90 degree hybrid coupler; and produce the intermediate frequency signal at the intermediate frequency signal port in response to combined output of the pair of power detectors at an intermediate frequency signal port side of the pair of power detectors, said output being in response to said fluctuation of voltages at the hybrid coupler side of the pair of power detectors.

In some embodiments, in addition to the interferometric unit cell design mentioned above, the plurality of modes further includes the wireless signal angle of arrival detector mode, in which four of the unit cells operate in the wireless signal angle of arrival detector mode and belong to a same one of the first subset and the second subset. These four unit cells cooperate to determine a wireless signal angle of arrival as already mentioned above. Furthermore, each of the four unit cells is configured to: allow voltages at a hybrid coupler side of the pair of power detectors to fluctuate in response to the output of the local oscillator in combination with the received wireless signal, the combination being due to operation of the 90 degree hybrid coupler; and produce a respective intermediate frequency signal at the intermediate frequency signal port in response to combined output of the pair of power detectors at an intermediate frequency signal port side of the pair of power detectors. The output is in response to the fluctuation of voltages at the hybrid coupler side of the pair of power detectors. Outputs of the respective intermediate frequency signals of the four unit cells are combined to provide an indication of the wireless signal angle of arrival.

Embodiments provide for a method in relation to the above-identified aspects and embodiments. The method may include operating the above-described apparatus, for example using a controller. The operation can include selecting unit cells to operate in one or more of a plurality of modes, such as wireless transmitter mode and wireless receiver mode, and also potentially including angle of arrival detection mode and power harvesting mode. The operation can further include causing the unit cells to operate in the selected modes. The operation can further include performing, by the unit cells operating in the selected modes, tasks such as wireless transmission, wireless reception, angle of arrival detection, and power harvesting. In various embodiments the selection of unit cells to operate in the wireless reception mode can be based at least in part on information obtained from unit cells operating in the angle of arrival detection mode, for the same incoming wireless signal. The method may include other operations of the controller, or of the unit cells, or both, as described herein. The method may additionally or alternatively include operations of the reference frequency distribution component, as described herein.

According to an aspect, there is provided a method comprising, by an electronic controller operating the apparatus as already described above. The operation includes selecting groups of the plurality of unit cells, each one of the groups being selected to operate in a respective one of the plurality of modes; and causing said selected groups to operate in said respective one of the plurality of modes.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present disclosure provide for a virtual transceiver matrix (VTM), which includes a set of wireless communication elements (unit cells, or simply cells) arranged in a two-dimensional array. Each of the unit cells is selectably and dynamically reconfigurable and allocatable to support a particular purpose by operating the cell in one of a plurality of modes. Modes include at least a wireless transmitter mode and a wireless receiver mode, but may also include one or both of a wireless signal angle of arrival (AoA) detector mode and a wireless energy power harvesting mode. By allocating one or more appropriate sets of unit cells to one or more corresponding tasks, the VTM can be dynamically reconfigured to support a variety of different transceiver operations. Multiple such operations can be supported concurrently. The cell allocations can change over time to support different operations.

Figure 1A:
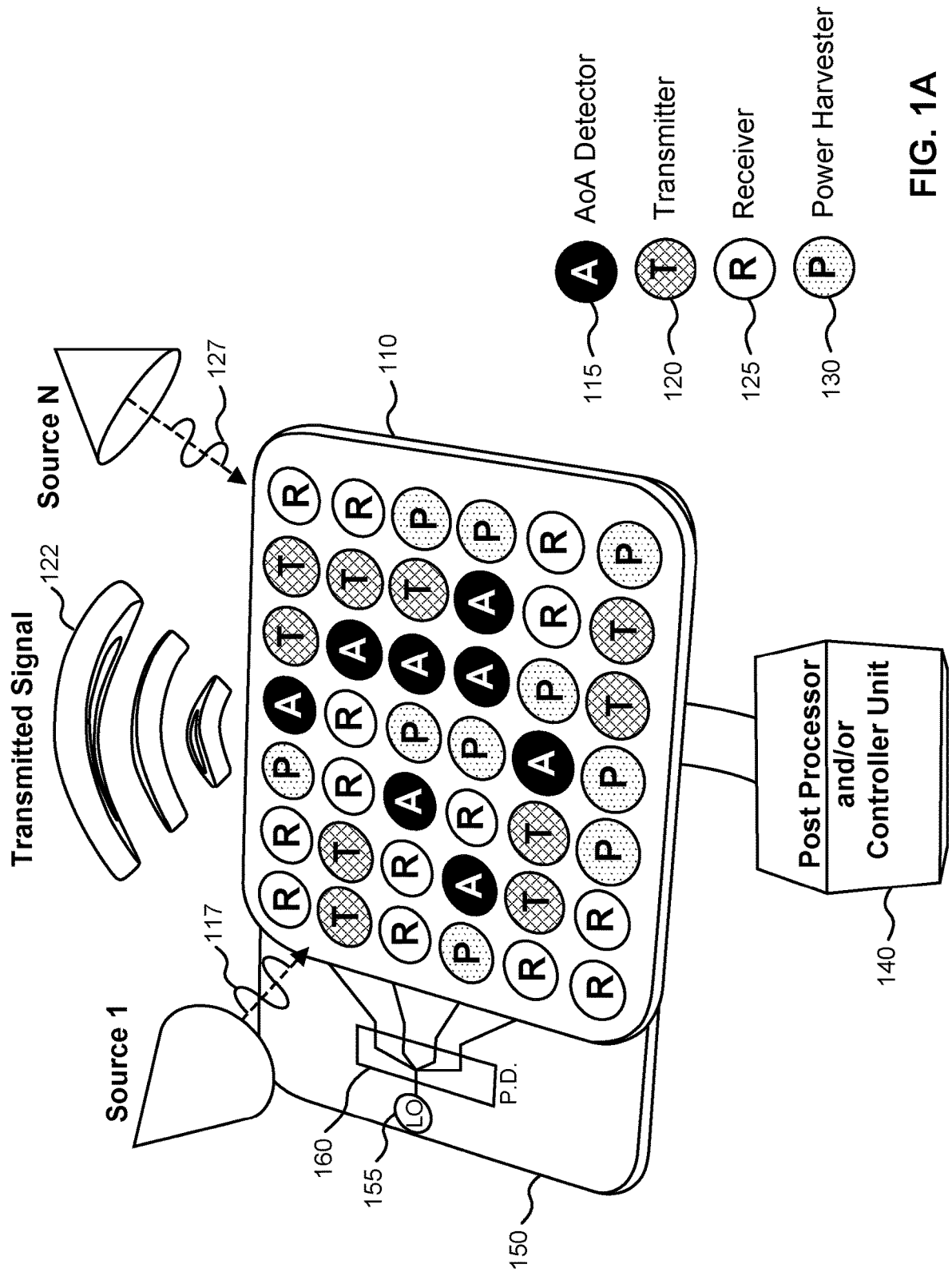
FIG. 1A illustrates a virtual transceiver matrix apparatus, according to embodiments of the present disclosure.

FIG. 1A conceptually illustrates a VTM 100 according to an embodiment of the present disclosure. The array 110 of unit cells includes a first group 115 of cells operating in wireless signal AoA detector mode and configured to cooperatively detect AoA of at least one incoming wireless signal 117. The array 110 of unit cells includes a second group 120 of cells operating in wireless transmitter mode and configured to cooperatively transmit an outgoing wireless signal 122. The array 110 of unit cells includes a third group 125 of cells operating in wireless transmitter mode and configured to cooperatively receive the incoming wireless signal 117 or another incoming wireless signal 127. The array 110 of unit cells includes a fourth group 130 of cells each operating in wireless energy power harvesting mode and configured to convert wireless signal energy (due to incoming wireless signals) into electrical energy usable for powering electrical components, either directly or via energy storage.

Figure 1B:
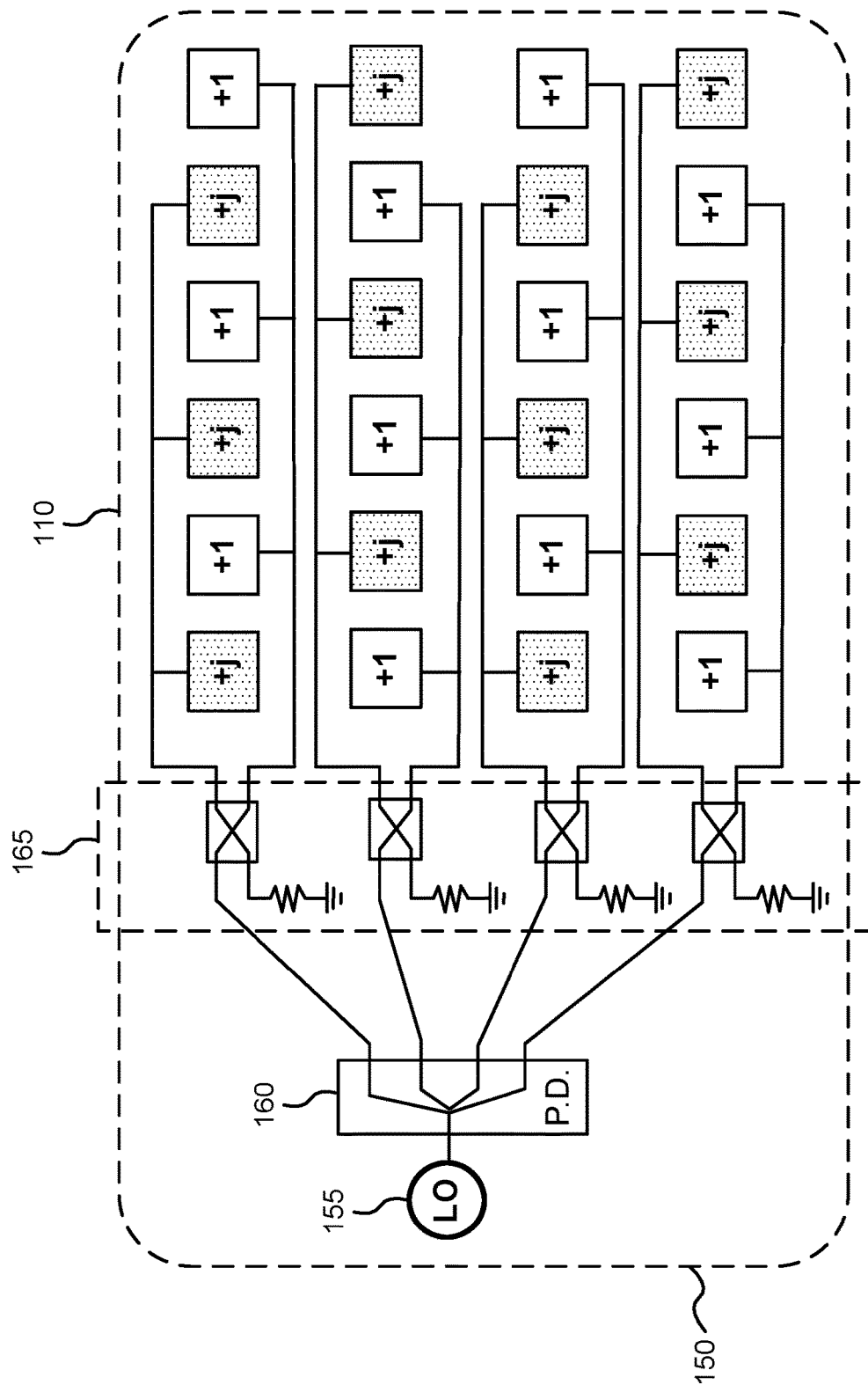
FIG. 1B illustrates a block diagram of components of the virtual transceiver matrix apparatus of FIG. 1A, including a reference frequency distribution component, according to embodiments of the present disclosure.

The VTM 100 further includes a reference frequency distribution component 150. This component is configured to distribute an electrical reference frequency signal to each of the unit cells in the array 110. The reference frequency distribution component 150 may generate the reference frequency signal, or it may receive the reference frequency from another source, e.g. wirelessly or via a waveguide or other signal pathway. The reference frequency distribution component is more clearly illustrated in FIG. 1B, which is a schematic representation of the VTM 100. As shown in FIG. 1B, the reference frequency distribution component 150 receives the reference frequency signal from a local oscillator (LO) 155, which may be included in the reference frequency distribution component 150 or else separate therefrom. Also included is a power divider (PD) 160 which distributes the reference frequency signal to multiple 90 degree hybrid couplers 165. For example, the PD 160 may create multiple parallel copies of the reference frequency signal and provide one copy to each hybrid coupler 165. Each hybrid coupler 165 receives the reference frequency signal and generates a copy of the in-phase version of the reference frequency signal and a copy of the quadrature version of the reference frequency signal. Each of the unit cells in a first subset is provided with one of the so-generated in-phase versions of the reference frequency signals, and each of the unit cells in a second subset is provided with one of the so-generated quadrature versions of the reference frequency signals. This is facilitated by the connections between hybrid couplers 165 and unit cells in FIG. 1B. In various embodiments, as shown, adjacent unit cells may receive their versions of reference frequency signal from the same hybrid coupler. This can be achieved via the illustrated branches in the signal path between hybrid couplers and unit cells, which may be considered to provide for a further power divider.

By way of the above arrangement, an in-phase version of the reference frequency signal (with zero degree phase shift relative to the signal produced by LO 155) is delivered to a first subset of the plurality of unit cells, and a quadrature version of the reference frequency signal (with 90 degree phase shift relative to the signal produced by LO 155) is delivered to a second subset of the plurality of unit cells. This configuration may be used as described below to facilitate wireless signal transmission and reception of (for example) quadrature amplitude modulated (QAM) signals. The array 110 may be composed of (consist essentially of) this first and second subsets of the plurality of cells. Other approaches to achieve this configuration are also possible. For example, an in-phase and a quadrature version of the reference frequency signal can be generated first, and then subsequently the in-phase version can be distributed to the first subset of unit cells, while the quadrature version can be distributed to the second subset of unit cells. As another example, the in-phase versions can be provided directly to the unit cells from the power dividers, without requiring the hybrid coupler. Yet another example is evident from FIG. 8, in which a reference frequency signal is divided into four portions using a first series of T-junctions (leftmost side), which can be considered as a form of power divider. The four portions are provided to four 90 degree hybrid couplers. The outputs of the hybrid couplers are divided once more via T-junctions to generate additional copies of the in-phase and quadrature versions of the reference frequency signals produced by the hybrid couplers.

Furthermore, in various embodiments, operating different unit cells with different phases of reference frequency facilitates receiving and demodulating of QAM signals which are incident on the array of unit cells at an angle of arrival which is substantially perpendicular to the plane of the array.

In various embodiments, measures can be taken to provide certain groups of unit cells, or all unit cells, with closely synchronized versions of the reference frequency signal. Two in-phase (or quadrature) versions of the reference frequency signal are considered to be synchronized if they exhibit substantially 0 degrees of relative phase shift. An in-phase version and a quadrature version of the reference frequency signal are considered to be synchronized if they exhibit substantially 90 degrees of relative phase shift. Synchronization can be achieved through various approaches, such as configuring transmission line lengths by intentional routing or introducing of meandering portions, for example.

As will be described elsewhere, each of the unit cells may amplify its received reference frequency signal, or otherwise operate its own local oscillator based on its received reference frequency signal. For this reason, the reference frequency signal handled by the reference frequency distribution component 150 does not necessarily need to be a high-power signal. To facilitate equal amplitude and determined phase difference between cells, injection-locked oscillators may be used within the unit cells, along with the illustrated hybrid couplers and power dividers. The reference frequency distribution component 150 along with the array 110 can thus comprise an injection-locked oscillator network, for LO phase distribution. An injection-locked oscillator refers to an oscillator which outputs a signal that matches the frequency of a source reference frequency signal. The injection-locked oscillator may also match the phase of the source reference frequency signal as input to the oscillator, e.g. as output by an intermediate hybrid coupler.

Figure 2A:
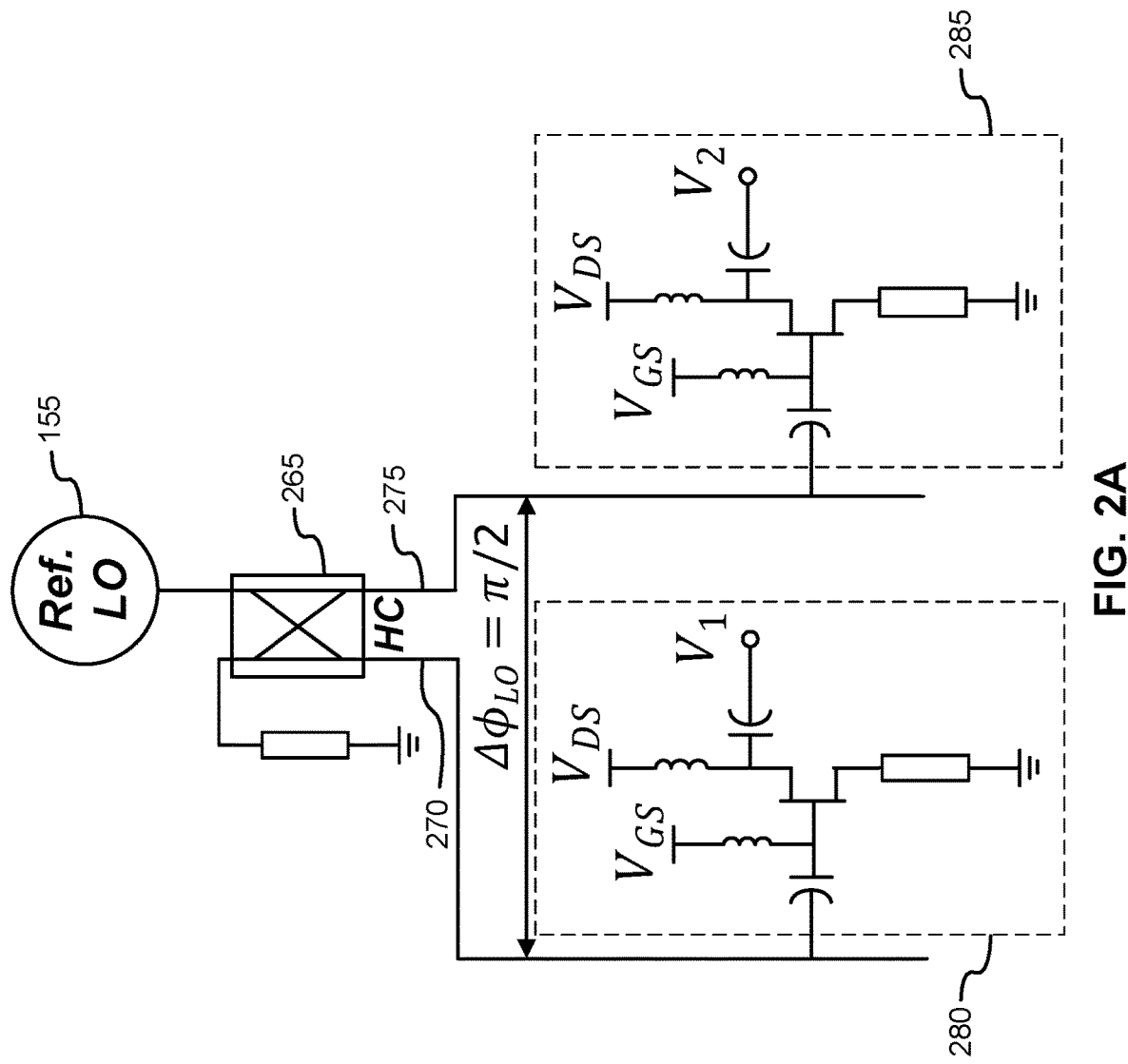
FIG. 2A illustrates aspects of a reference frequency distribution component and on-board local oscillator, according to embodiments of the present disclosure.

FIG. 2A illustrates an example portion of such an injection-locked oscillator network or reference frequency distribution component, according to an embodiment. The LO 155 provides its reference frequency signal to the hybrid coupler 265, which may be one of the hybrid couplers 165 of the reference frequency distribution component 150. The reference frequency signal can be a sinusoid with constant frequency, for example. The hybrid coupler 265 provides two output signals 270, 275, which are 90 degree ($\pi/2$ radians) out-of-phase (i.e. quadrature) versions of the provided reference frequency signal. The output signal 270 is fed to a first on-board local oscillator 280 of a first unit cell, which amplifies (using field effect transistors) and outputs a version of the reference frequency signal as voltage V1. The other output signal 275 is fed to a second on-board local oscillator 285 of a second unit cell, which amplifies and outputs a version of the reference frequency signal as voltage V2. Accordingly, oscillators in each unit-cell are injection-locked to the frequency of reference LO with the same amplitude over the entire VTM but with appropriate phases. The hybrid coupler provides this 90-degree phase shift between the oscillators of adjacent unit cells.

Figure 2B:
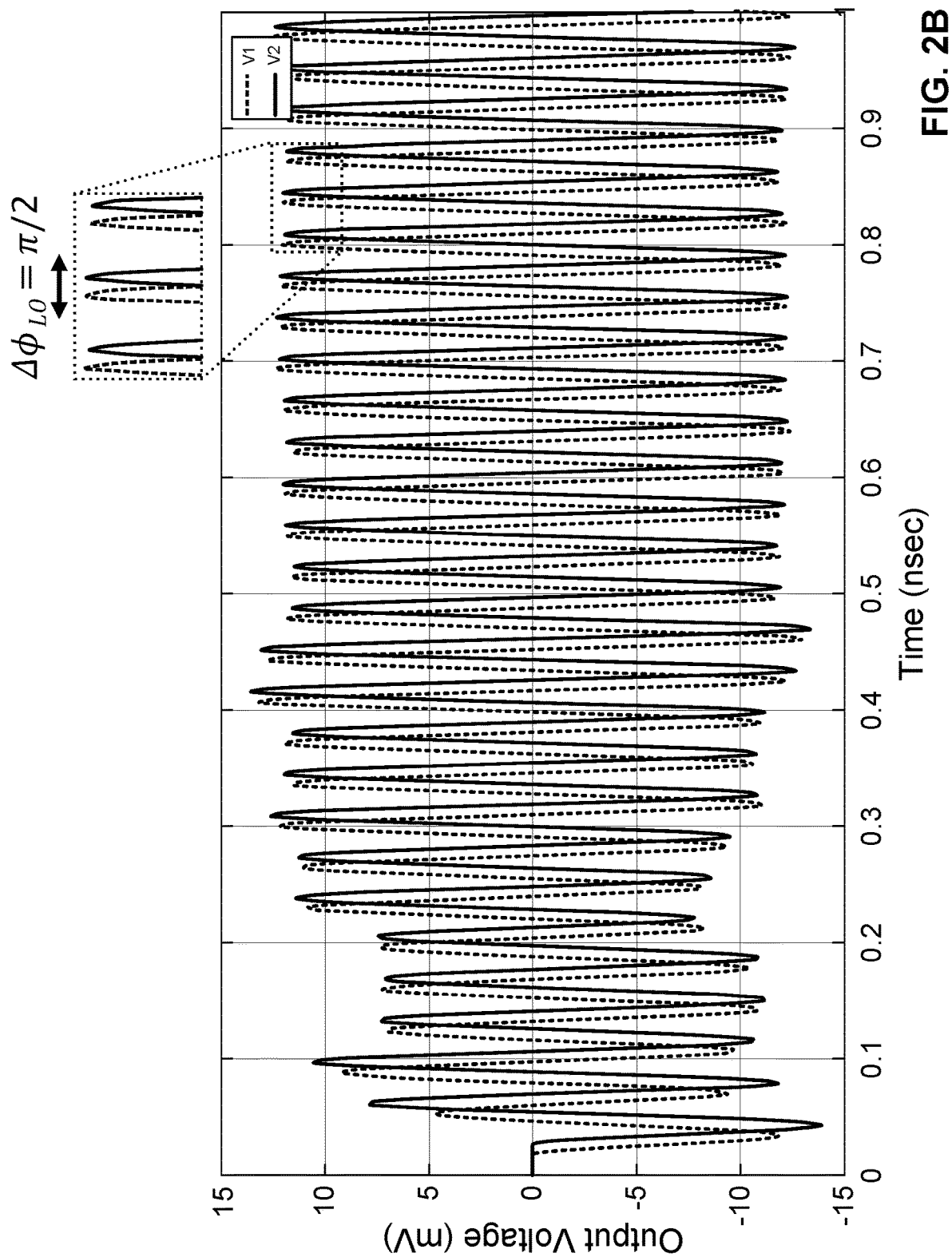
FIG. 2B illustrates 90-degree phase shifted versions of reference frequency signals facilitated by a reference frequency distribution component, according to embodiments of the present disclosure.

FIG. 2B illustrates the output voltages V1 and V2 of FIG. 2A, i.e. of the first and second on-board local oscillators 280, 285 respectively, showing the $\Delta\phi_{LO}=\pi/2$ radian phase shift between adjacent unit cells, according to an example embodiment.

As also shown in FIG. 1B, the first subset of unit cells, consisting of the unit cells fed with the in-phase version of the reference frequency signal, and the second subset of unit cells, consisting of the unit cells fed with the quadrature version of the reference frequency signal, are interleaved according to a checkerboard pattern. That is, the unit cells are arranged in a rectangular array and alternating diagonals of the array consist of unit cells of the first set and unit cells of the second set, respectively. In this way, each one of the unit cells belonging to the first subset is adjacent to at least one of the unit cells belonging to the second subset. As illustrated, such an adjacency condition holds for each cell in the upward, downward, left, and right directions within the array (whenever an adjacent cell exists in such a direction). The adjacency condition can hold in other ways for alternative configurations. For example, the array may consist of alternating rows of unit cells, where each row consists of unit cells from one of the first and second subsets, and the rows alternate so that each (non-edge) row of unit cells of the first subset is below a row of unit cells of the second subset and above another row of unit cells of the second subset. As another example, pairs of rows of unit cells of the first subset can alternate with pairs of rows of the second subset. A similar arrangement can be made for columns. For non-rectangular arrays (e.g. hexagonal arrays), similar arrangements can be made. The pattern of unit cells may be configured so that the VTM supports a corresponding operating scenario or application. Different parts of the VTM may be configured according to different patterns of unit cells.

Furthermore, as in the checkerboard pattern above, the first subset may form a first two-dimensional pattern of unit cells, e.g. a regular pattern of rows and columns, with adjacent rows and columns being diagonally offset from one another, and the second subset may form a second two-dimensional pattern of unit cells, e.g. a similar regular pattern. Furthermore, the first two-dimensional pattern and the second two-dimensional pattern may be interleaved to form an overall pattern within the two-dimensional array. Indeed, the overall pattern may be a checkerboard pattern as described above.

Such patterns of unit cells in the array may provide for several benefits. For example, pairs of unit cells, fed with in-phase and quadrature reference frequency signals, are always adjacent to one another, possibly in one, two, three, four or more (e.g. in the case of a hexagonal array) directions. This allows for such pairs to be operated together for handling wireless signals. Furthermore, with regular patterns, such pairs (or groups) of cells can be located arbitrarily within the array, to support dynamic reconfigurability of the VTM. Adjacent cells can be fed with their reference frequency signals from a same (e.g. nearby) 90 degree hybrid coupler, which facilitates close synchronization thereof, for example since transmission line lengths between the hybrid coupler and the two adjacent cells can be made to be substantially equal.

Referring again to FIG. 1A, the VTM 100 further includes a controller unit 140, which may also include a post processor. The controller unit 140 is configured to direct operations of the VTM, for example by allocating certain unit cells to certain tasks and triggering their configuration and subsequent operation in support of those tasks. In more detail, the controller may be configured to allocate one or more groups of the unit cells (e.g. groups 115, 120, 125, 130) to one or more corresponding transmission, reception, AoA or power harvesting tasks, and to configure unit cells of each group to perform these tasks. The post processor may process received intermediate frequency signals, generate intermediate frequency signals for use in transmission, etc.

In various embodiments, the controller can dynamically configure the state of VTM unit-cells based at least in part on incoming wireless signal properties such as AoA, polarization, and frequency. A set of unit cells can be configured for AoA detection, and based on the AoA and other detected parameters such as the polarization and frequency, an appropriate group of unit cells can be configured to operate collectively as a receiver for the incoming wireless signal. Thus, in a scenario involving incoming wireless signals from unknown sources, first, AoA detectors may be activated, and then other receiving units may be activated accordingly. Therefore, the VTM is dynamically reconfigured. At a given time, unit cells that are not being used for AoA detection, transmission or reception, can be instead used for power harvesting. The controller can allocate different groups of cells to different tasks, based on current operating requirements, signal characteristics, power consumption requirements, etc.

The VTM can thus be multifunctional and dynamically reconfigured for one or more operations such as transmission operations, reception operations, AoA detection operations, and power harvesting operations. Transceiver channels are not fixed, but are rather "floating" in the array of cells. That is, given a particular pattern of unit cells required for an operation or associated channel, a set of available unit cells corresponding to this pattern can be selected somewhat arbitrarily. The unit cells allocated for a particular transmission or reception task can change dynamically depending on incoming signal properties, such as AoA, polarization and frequency. This approach leads to the implementation of one or more virtual transmitters, receivers, or transceivers by the apparatus. Each virtual transmitter, receiver, or transceiver includes a combination of unit cells at particular (relative) physical locations in the array. It is also noted that a two-dimensional array of such virtual transceivers can yield significant degrees of freedom to implement multiple functionalities and operations in a single apparatus. Such functionalities can include AoA detection, polarization detection, Radar operation, sensing, and imaging, for example.

In some embodiments, e.g. concurrently, the baseband recovered data from each unit cell can be reused for different functionality and data processing in connection with channel synthesis, therefore leading to its high capacity and efficiency of power and data management. Accordingly, the baseband signal output for example by power detectors (see embodiments of FIGS. 3 and 4) may be used not only for receiving function but also for other applications such as AoA detection.

In some embodiments, the controller determines a number of cells forming a group based on one or a combination (e.g. trade-off) of requirements. The group can be configured for signal transmission, signal reception, AoA detection, or power harvesting. The controller can determine numbers of cells forming multiple groups concurrently, e.g. trading off requirements between groups. The requirements can include a power consumption criterion, noting that the more cells that are allocated to a group, the higher the power consumption will be. The requirements can include a performance criterion for a wireless transmission operation, noting that the more cells that are allocated to a group, the higher certain transmission performance characteristics may be, such as signal power, signal-to-noise ratio, error rate, and directivity. The requirements can include a performance criterion for a wireless reception operation, noting that the more cells that are allocated to a group, the higher certain reception performance characteristics may be, such as signal-to-noise ratio, error rate, and directivity. The determination may additionally or alternatively be based on a cell allocation budget, which determines the number of cells to be allocated to a given task for example based on a proportion of the overall cells available. The controller can determine the number based on operating mode. For example, at least two cells may be required for QAM signal transmission or reception, and at least four cells may be required for AoA detection.

In various embodiments, the required gain of a transmitted wireless signal may be used to determine the number of activated transmitter cells. The signal-to-noise ratio (SNR) may be the basic factor for determining the number of receiver cells. As a rule of thumb, the larger the number of activated transceiver cells, the better the SNR or directivity of a radiated pattern becomes, respectively. The number of activated cells can further facilitate a required amount of beamforming for transmission or reception.

Similarly, in some embodiments, the controller determines a pattern of cells forming at least one of the groups based on one or a combination of requirements. The requirements can include a polarization of the outgoing wireless signal or the incoming wireless signal. The requirements can include a frequency of the outgoing wireless signal or the incoming wireless signal. For example, the inter-cell spacing may be configured based at least in part on signal frequency, as is evident elsewhere herein. The requirements can include a direction for transmission of the outgoing wireless signal. The requirements can include an angle of arrival of the incoming wireless signal. For example, the inter-cell spacing may be configured based at least in part on AoA, as is evident elsewhere herein. The controller can determine the pattern based on operating mode. For example, the AoA detector cells may be arranged in a zig-zag pattern for a checkerboard arrangement of unit cells.

It is also noted that, when cells operate in AoA detector mode, the resultant information on angle of arrival of an incoming wireless signal can be used to configure the pattern of cells subsequently used reception of that same incoming wireless signal. Thus, the angle of arrival of the incoming wireless signal may be determined using the wireless signal angle of arrival detector mode, operating prior to the controller determining the pattern of cells.

As noted above, in various embodiments the outgoing wireless signal or the incoming wireless signal is a QAM signal. Accordingly, and in various embodiments, each one of the unit cells belonging to the first subset and operating in the wireless transmitter mode may cooperate with at least another one of the unit cells belonging to the second subset and operating in the wireless transmitter mode to transmit such an outgoing wireless signal. This arrangement leverages the quadrature nature of the reference frequency signals provided to these two unit cells to facilitate generation and transmission of the QAM signal, or similar signals. For example, in this arrangement, one of the unit cells belonging to the first subset and operating in the wireless transmitter mode may transmit an in-phase portion of the QAM signal, and another one of the unit cells belonging to the second subset and operating in the wireless transmitter mode may transmit a quadrature portion of the QAM signal. As mentioned elsewhere herein, these two unit cells may be physically adjacent within the two-dimensional array of cells.

The same arrangement may also be true for unit cells operating in the receiver mode. However, depending on characteristics such as frequency and angle of arrival, two unit cells operating in the wireless receiver mode might belong to the same subset or to different subsets, as will be explained elsewhere herein. Nevertheless, in various embodiments, particularly for QAM or similar signals, each one of the unit cells operating in the wireless receiver mode may cooperate with at least another one of the unit cells operating in the wireless receiver mode to receive an incoming wireless signal. Thus, transmission and reception operations may each utilize at least a pair of unit cells.

In more detail, and in some embodiments, one of a pair of unit cells operating in the wireless receiver mode provides an intermediate signal indicative of an in-phase portion of the incoming QAM signal. The other one of the pair of unit cells operating in the wireless receiver mode, and suitably spaced apart from the first one of the pair, provides an intermediate signal indicative of a quadrature portion of the incoming QAM signal. Furthermore, the pair of cells may be spaced apart from one another by a distance which is based on an angle of arrival of the incoming wireless signal and an operating wavelength of the incoming wireless signal. Additionally or alternatively, the distance may be interrelated with the relative phases (in-phase or quadrature) of local oscillators of the unit cells. Such a configuration is described in more detail elsewhere herein, for example with respect to the below example of interferometric transceiver cells. The unit cells are each dynamically and independently reconfigurable into any one of a plurality of modes, including at least the wireless transmitter mode and the wireless receiver mode. According to an illustrative embodiment, an interferometric unit cell is described below. The interferometric transceiver is one approach for potentially providing a low-power single down-conversion scheme to baseband or IF transceiver. However, other configurations of interferometric unit cells, or other types of cells, may be substituted according to other embodiments. These other types of cells may similarly use the phase difference of incoming wireless signals to demodulate a signal.

Figure 3:
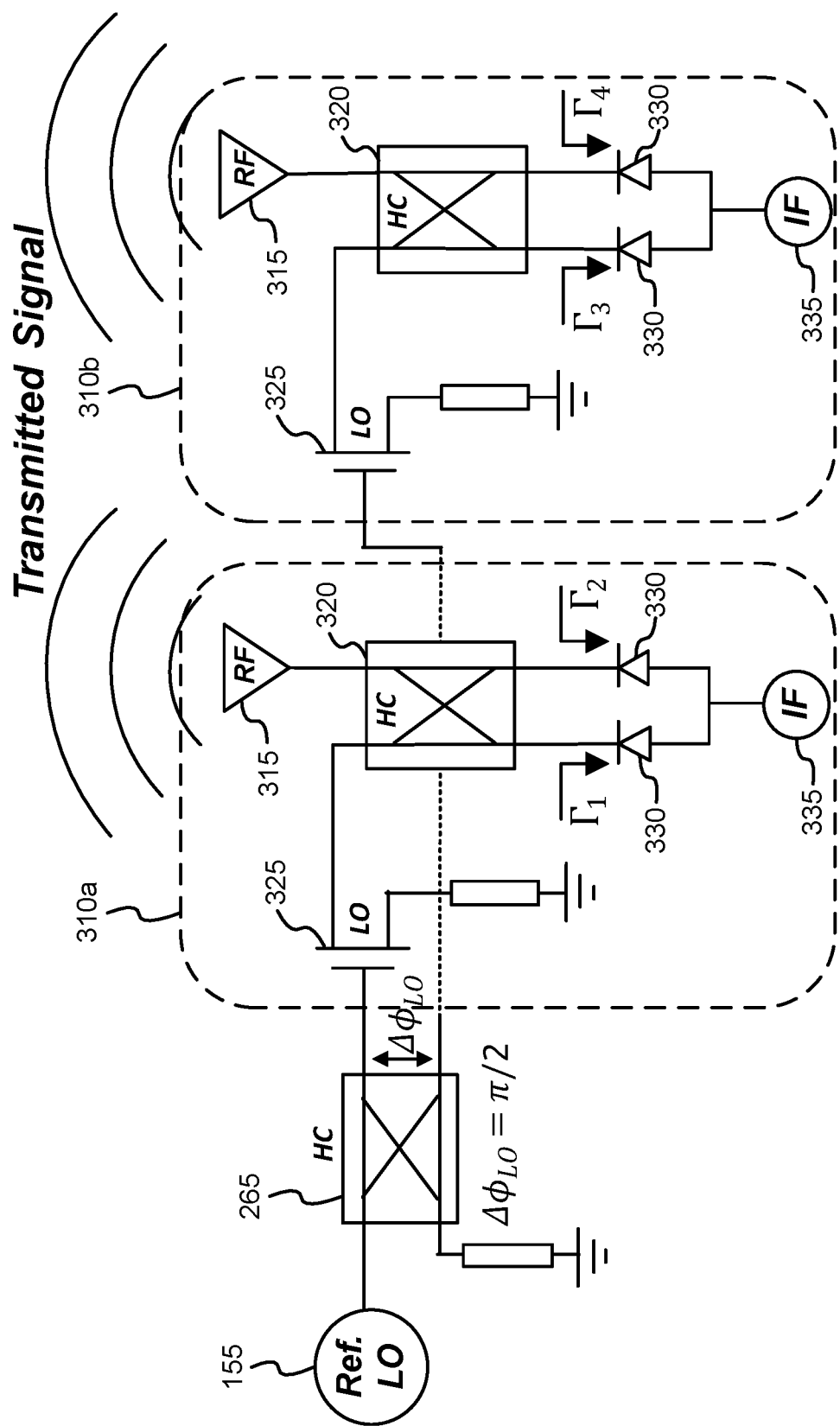
FIG. 3 illustrates a pair of unit cells fed respectively by 90-degree phase shifted versions of reference frequency signals and operating in a transmitter mode, according to embodiments of the present disclosure incorporating an interferometric transmitter configuration.
Figure 4:
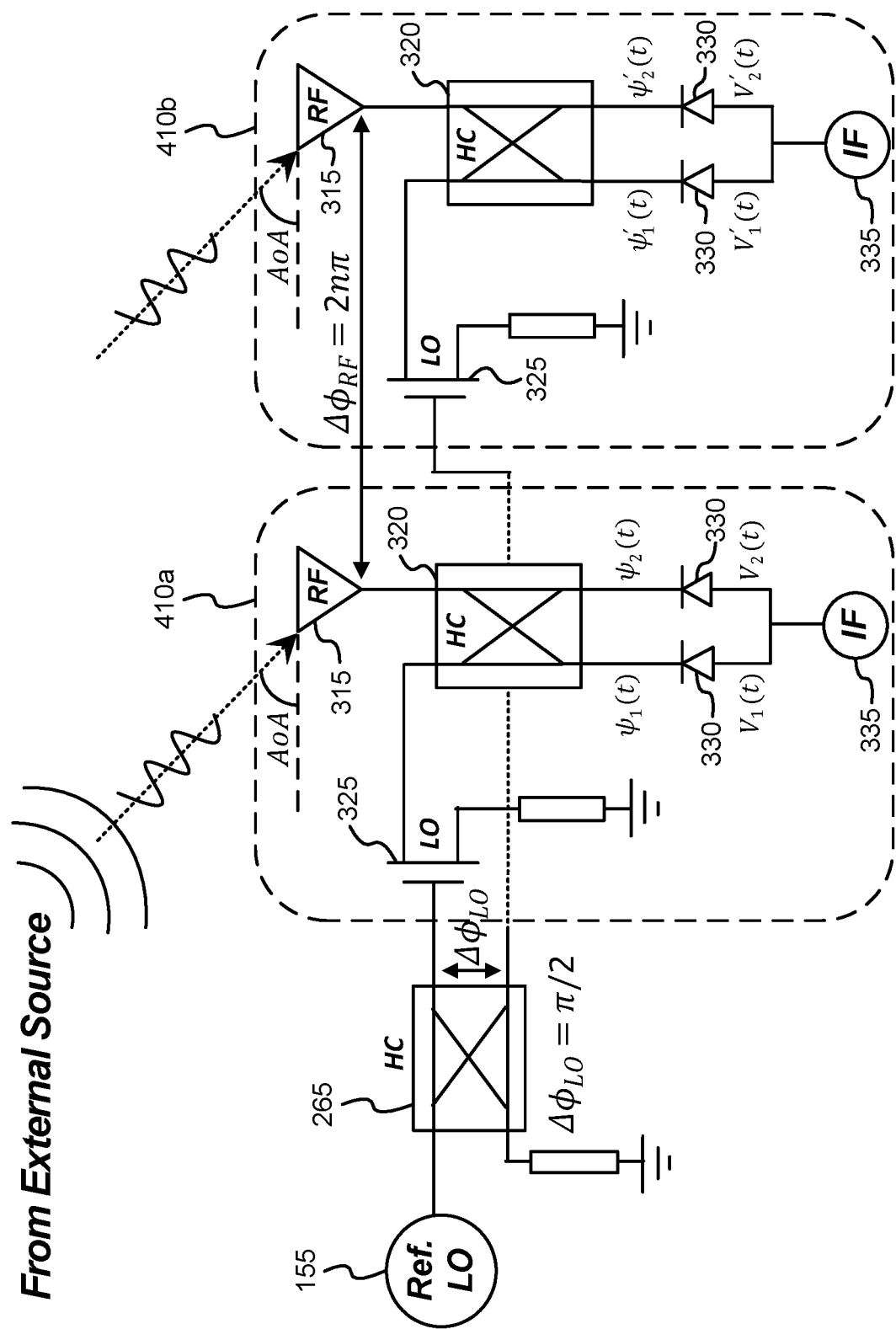
FIG. 4 illustrates a pair of unit cells fed respectively (for illustration) by 90-degree phase shifted versions of reference frequency signals and operating in a receiver mode, according to embodiments of the present disclosure incorporating an interferometric receiver configuration.

FIG. 3 illustrates a pair of interferometric unit cells 310a, 310b operating in wireless transmitter mode, according to an embodiment. FIG. 4 illustrates a pair of interferometric unit cells 410a, 410b operating in wireless receiver mode, according to an embodiment. One or both of the unit cells 310a, 310b can be the same as one or both of the unit cells 410a, 410b. However this is not necessarily the case, although all illustrated cells have the same structure. The unit cells 310a, 310b may be adjacent cells within the array structure, or alternatively non-adjacent. The unit cells 310a, 310b are fed reference frequency signals in quadrature for example by the reference frequency distribution component 150 or the apparatus of FIG. 2A. As illustrated by way of a simplified example (not showing all details of the reference frequency distribution component 150), a hybrid coupler (HC) 265 provides the unit cells 310a, 310b with reference frequency signals, from the reference local oscillator (LO) 155, which are out of phase by $\Delta\phi_{LO}=\pi/2$ radians (90 degrees). These reference frequency signals are used to drive respective on-board local oscillators 325 of the unit cells. For example, each on-board local oscillator 325 can output a local (to the cell) reference frequency signal which is substantially identical, in frequency and phase, to the reference frequency signal provided to that cell by the HC. Thus, the on-board local oscillators are synchronized to the reference frequency signals received by the cells, e.g. connected and injection-locked to a reference local oscillator. Note that the local reference frequency signals of the two cells 310a, 310b are thus also quadrature in phase (relatively out of phase by $\pi/2$ radians). That is, adjacent unit cells exhibit a 90 degree local oscillator phase shift with respect to each other, since the 90 degree hybrid coupler (e.g. of the reference frequency distribution component 150) divides the reference frequency signal in this manner.

The unit cells 310a and 310b of FIG. 3 each include an antenna 315, a 90 degree hybrid coupler 320, an on-board local oscillator 325, and a pair of power detectors 330, such as zero biased power detectors. The power detectors can be or include zero-biased Schottky diodes, for example. The local oscillator 325 may be a field effect transistor (FET) oscillator. The antenna 315 can be replaced by an antenna port in some embodiments, with the antenna being a separate component. The antenna is used for transmitting or receiving a wireless signal, depending on the operating mode. The unit cell 310a also includes an intermediate frequency (IF) signal port 335. The unit cell 310b has an identical structure to the unit cell 310a. In more detail, in the wireless transmitter mode, the IF signal port 335 provides, to the unit cell, an IF signal for use in generating the outgoing wireless signal for transmission. The IF signal can be used to (e.g. differentially) drive the pair of power detectors 330, which are operatively coupled to the IF signal port 335. The IF signal is received from outside of the unit cell, for example from a signal generator which may be part of or external to the apparatus and which generates the IF signal based on information to be communicated, as will be readily understood by a worker skilled in the art. The summation reflection coefficients from each IF source should be equal to in-phase or quadrature components to radiate a total QAM signal.

The 90 degree hybrid coupler 320 has four terminals. First and second terminals are each coupled to a respective one of the pair of power detectors 330. In this way, the power detectors 330 are coupled between the intermediate frequency signal port 335 and the 90 degree hybrid coupler 320. For more certainty, it is noted that the first terminal and the second terminal are out of phase with respect to, and/or isolated from one another. According to the out of phase aspect, a first signal input to the first terminal and a second signal input to the second terminal would result, at one of the output terminals, in an output signal which is a combination of part of the first signal plus part of the second signal, where one of these parts is phase shifted by 90 degrees. According to the isolation aspect, a signal input to one of these terminals would not have any of its portion output at the other one of these terminals. A third terminal of the 90 degree hybrid coupler 320 is coupled to the on-board local oscillator 325. A fourth terminal of the 90 degree hybrid coupler 320 is coupled to the antenna 315 or the antenna port.

For transmission, the wireless signal for transmission is provided, to the antenna 315 (or antenna port) based on outputs of the pair of power detectors 330 and output of the on-board local oscillator 325. The wireless signal for transmission is provided due to signal combining using the 90 degree hybrid coupler 320. This combining includes mixing of the intermediate frequency signal with the reference frequency signal.

In more detail, the LO signal generated by the on-board local oscillator 325 can be expressed as:

$$S_{LO}(t)=a_{LO}e^{j\omega t} \quad (1)$$

Then, the output wireless signal for transmission by the first unit cell can be calculated using reflection coefficients ($\Gamma_1(t)$, $\Gamma_2(t)$) from the two ports of the hybrid coupler 320 that are connected to the power detectors 330, with reference to the injected LO power. The output wireless signal can be thereby expressed as:

$$S_{RF_1}(t)=K a_{LO}[\Gamma_1(t)+\Gamma_2(t)]e^{j\omega t} \quad (2)$$

Therefore, the summation of the reflection coefficients in (2) can be assigned equal to the in-phase component $I(t)$ of a QAM signal via:

$$\Gamma_1(t)+\Gamma_2(t)=\alpha(t)\cos(\theta(t))=I(t) \quad (3)$$

In (3), $\alpha(t)$ and $\theta(t)$ are the modulated amplitude and phase of baseband signals, respectively.

Turning now to the second unit cell 310b of FIG. 3, the LO signal generated by the on-board local oscillator of the second unit cell, having a 90 degree phase shift from that of the first unit cell 310a, can be expressed as:

$$S_{LO}'=ja_{LO}e^{j\omega t} \quad (4)$$

Then, the output wireless signal for transmission by the second unit cell can be calculated similarly to (2). The reflection coefficients ($\Gamma_3(t)$, $\Gamma_4(t)$) of the connected power detectors of the second unit-cell 310b can be assigned to the quadrature component of the above-mentioned QAM signal, and the output wireless signal for transmission by the second unit cell can be expressed as:

$$S_{RF_Q}(t)=jKa_{LO}[\Gamma_3(t)+\Gamma_4(t)]e^{j\omega t} \quad (5)$$

The summation of the reflection coefficients in (5) can be assigned equal to the quadrature component $Q(t)$ of the QAM signal via:

$$\Gamma_3(t)+\Gamma_4(t)=\alpha(t)\sin(\theta(t))=Q(t) \quad (6)$$

Consequently, each unit-cell operating in the wireless transmitter mode may transmit either the in-phase or quadrature components and the summation of both signals will be radiated as a QAM signal. In the wireless receiver mode, a unit cell (e.g. 410a or 410b) operates as follows. The components of the unit cells 410a, 410b are labeled the same as those of the unit cells 310a, 310b for clarity. At each unit cell, a wireless signal is received via the antenna 315 or antenna port and passed as input to the 90 degree hybrid coupler 320. The local oscillator 325 also provides its output to the 90 degree hybrid coupler 320. In response, voltages at the two other outputs of the hybrid coupler, which are also the voltages at a hybrid coupler side of the power detectors 330 are allowed to fluctuate, in response to the output of the local oscillator in combination with the received wireless signal. This signal combination is due to operation of the 90 degree hybrid coupler. No signal is injected into the unit cell via the IF signal port 335 when in receiver mode. Rather, the intermediate frequency signal is produced at the IF signal port 335 in response to combined outputs of the pair of power detectors 330. Such outputs are provided at intermediate frequency signal port sides of the power detectors and are in response to the above-mentioned fluctuation of voltages at the hybrid coupler sides of the power detectors. A pair of unit cells, with suitable spacing, cooperate in the above-described manner to receive and demodulate a QAM signal.

In more detail, consider the unit cells 410a and 410b of FIG. 4. An incoming wireless signal from an external source is incident on the antennas 315 of the unit cells with an angle of arrival having a value labelled AoA. For certainty, and in the case of a coherent receiver, the carrier frequency for both transmission and reception is considered to be the same. The received signal provided by the antenna of the unit cell 410a can be expressed as:

$$S_{RF}(t) = a_{RF}\alpha(t)e^{j(\omega t + \theta(t))} \quad (7)$$

If the injected LO signal from local oscillator 325 is considered as in Equation (1), the output signals of the 90-degree hybrid coupler ports (coupled to the power detectors 330) can be expressed as:

$$\psi_1(t) = \frac{-a_{LO}}{\sqrt{2}}e^{j\omega t}\left[j\frac{a_{RF}}{a_{LO}}\alpha(t)e^{j\theta(t)} + 1\right] \quad (8)$$

$$\psi_2(t) = \frac{-a_{LO}}{\sqrt{2}}e^{j\omega t}\left[\frac{a_{RF}}{a_{LO}}\alpha(t)e^{j\theta(t)} + j\right] \quad (9)$$

The signals in Equations (8) and (9) represent the voltages at the hybrid coupler sides of the pair of power detectors. These two signals are provided to the pair of power detectors where their output baseband signals are extracted. The outputs of the power detectors (on the IF signal port side of the power detectors) are proportional to their input RF powers and thus the outputs can be expressed as:

$$V_i(t) = K|\psi_i(t)|^2 \quad i=1,2 \quad (10)$$

In Equation (10) K is a constant, determined by the type of power detectors. Accordingly, the output voltages of the two power detectors (on the IF signal port side) can be described as follows:

$$V_1(t) = \frac{Ka_{LO}^2}{2}\left[1 + \left(\frac{a_{RF}}{a_{LO}}\right)^2\alpha^2(t) - 2\left(\frac{a_{RF}}{a_{LO}}\right)\alpha(t)\sin(\theta(t))\right] \quad (11)$$

$$V_2(t) = \frac{Ka_{LO}^2}{2}\left[1 + \left(\frac{a_{RF}}{a_{LO}}\right)^2\alpha^2(t) + 2\left(\frac{a_{RF}}{a_{LO}}\right)\alpha(t)\sin(\theta(t))\right] \quad (12)$$

An operational amplifier (not shown) or other device may be provided and used to subtract the two voltages represented in Equations (11) and (12). Such a subtraction of the two output voltages will result in a signal indicative of the quadrature component of the QAM signal (the incoming wireless signal), expressed as:

$$V_D(t) = Q(t) = 2Ka_{LO}a_{RF}[\alpha(t)\sin(\theta(t))] \quad (13)$$

It remains to determine the in-phase component of the QAM signal, and this requires the participation of both unit cells 410a and 410b. Moreover, the two unit cells are to be selected so that they have a particular spacing, which depends on the angle of arrival AoA of the incoming wireless signal as well as the carrier wavelength. For this reason, angle of arrival detection for an incoming wireless signal is typically performed before the unit cells operating in receiver mode to receive the incoming wireless signal, so that the unit cells can be selected and configured accordingly.

The phase differences between received signals at two distinct antennas in different cells can be formulated as follows:

$$\Delta\phi_{RF} = \frac{2\pi}{\lambda}d\cos(AoA) \quad (14)$$

In Equation (14), d is the inter-element distance between the two unit cells cooperating in the receiver mode and distributed in the array of unit cells, λ is the operational wavelength, and AoA is the angle of arrival of the incoming wireless signal (considered to be the same for both unit cells 410a, 410b). In order to demodulate the in-phase component of the QAM signal, the phase difference $\Delta\phi_{RF}$ should be equal to 2nπ or else 2nπ+π/2 (as explained below), for some integer n. The length units for d and λ are assumed to be the same.

In more detail, there are two general possibilities for the unit cells 410a, 410b. The first possibility is that the LO phases of the two unit cells differ from one another by 90 degrees. The second possibility is that the LO phases of the two unit cells are the same. FIG. 4 shows the first possibility, since the two unit cells 410a, 410b are fed from two out-of-phase outputs of the same hybrid coupler. However, as is evident from FIG. 1B, multiple unit cells are fed with (and their on-board local oscillators locked to) the same in-phase version of the reference frequency signal, and also multiple unit cells are fed with (and their on-board local oscillators locked to) the same quadrature version of the reference frequency signal. Therefore it is possible to select two unit cells 410a, 410b so that they have the same LO phases. Table 1 shows these two possibilities for the receiver, and also, for convenience, shows the required phase difference for two unit cells cooperating to transmit a QAM signal, as already described above.

TABLE 1

Required phase shifts between cells for Rx and Tx functions

| Function | LO Phase Distribution | Required Phase Difference |
|---|---|---|
| Rx | (+1, +j) | $\Delta\phi_{RF} = 2n\pi$ |
|  | (+1, +1) or (+j, +j) | $\Delta\phi_{RF} = 2n\pi + \frac{\pi}{2}$ |
| Tx | (+1, +j) | $\Delta\phi_{LO} = \frac{\pi}{2}$ |

In view of the above, the RF signal as provided by the antenna 315 of the second unit cell 410b can be expressed as:

$$S_{RF}'(t) = a_{RF}\alpha(t)e^{j(\omega t + \theta(t))} \cdot e^{j\Delta\phi_{RF}} \quad (15)$$

The above-identified first possibility is now treated. In the case that the LO phases of the two unit cells differ from one another by 90 degrees (the first possibility), the LO signal generated by the on-board local oscillator 325 of the second unit cell 410b can be expressed (in comparison to the signal of Equation (1)) as:

$$S_{LO}'(t)=ja_{LO}e^{j\omega t} \qquad (16)$$

Similarly to the case for the first unit cell, in the second unit cell 410b, in view of injecting the antenna signal output as in Equation (15) and the LO power as in Equation (16) into the hybrid coupler 320 of the second unit cell 410b, the output signals of the 90-degree hybrid coupler ports (coupled to the power detectors 330) can be expressed as:

$$\psi_1'(1) = \frac{-ja_{LO}}{\sqrt{2}}e^{j\omega t}\left[1+\frac{a_{RF}}{a_{LO}}\alpha(t)e^{j(\theta(t)+\Delta\phi_{RF})}\right] \qquad (17)$$

$$\psi_2'(1) = \frac{a_{LO}}{\sqrt{2}}e^{j\omega t}\left[1-\frac{a_{RF}}{a_{LO}}\alpha(t)e^{j(\theta(t)+\Delta\phi_{RF})}\right] \qquad (18)$$

Accordingly, the output voltages of the two power detectors (on the IF signal port side) of the second unit cell 410b can be expressed as:

$$V_1'(t) = \frac{Ka_{LO}^2}{2}\left[1+\left(\frac{a_{RF}}{a_{LO}}\right)^2\alpha^2(t)+2\left(\frac{a_{RF}}{a_{LO}}\right)\alpha(t)\cos(\theta(t)+\Delta\phi_{RF})\right] \qquad (19)$$

$$V_2'(t) = \frac{Ka_{LO}^2}{2}\left[1+\left(\frac{a_{RF}}{a_{LO}}\right)^2\alpha^2(t)-2\left(\frac{a_{RF}}{a_{LO}}\right)\alpha(t)\cos(\theta(t)+\Delta\phi_{RF})\right] \qquad (20)$$

As before, an operational amplifier (not shown) or other device may be provided and used to subtract the two voltages represented in Equations (19) and (20). Such a subtraction of the two output voltages will result in a differential output which can be expressed as:

$$V_D'(t)=V_1'(t)-V_2'(t)=2Ka_{LO}a_{RF}[\alpha(t)\cos(\theta(t)+\Delta\phi_{RF})] \qquad (21)$$

By setting $\Delta\phi_{RF}=2n\pi$, the in-phase components of the QAM signal can be determined from Equation (21) as:

$$V_D'(t)=I(t)=2Ka_{LO}a_{RF}[\alpha(t)\cos(\theta(t)] \qquad (22)$$

Thus, according to Equations (13) and (22), the two unit cells, separated by a suitable distance, produce the in-phase and quadrature components of the incoming QAM wireless signal. Considering a complex vector of S(t)=I(t)+jQ(t), the demodulated signal can thus be extracted.

The above-identified second possibility is now considered. In this case the LO phases of the two unit cells are substantially the same (differ by 0 degrees). That is, instead of considering the injected local oscillator signal for the first unit cell as being according to Equation (1) and of considering the injected local oscillator signal for the second unit cell as being according to Equation (16), the injected local oscillator signals for both cells should be the same, i.e. both according to Equation (1) or Equation (16). For example, modified versions of Equations (8) and (9) can be derived by combining Equation (7) with Equation (16) instead of Equation (1). Carrying on in this manner, it can be determined that the in-phase and quadrature components of the incoming QAM signal can be provided by the first and second unit cells, respectively, (with in-phase on-board local oscillators) by requiring that the phase difference condition $\Delta\phi=2n\pi+\pi/2$ (instead of $\Delta\phi=2n\pi$).

In view of the above, it is evident that, in the above embodiment, the distance between the unit cells 410a and 410b for receiving an incoming QAM wireless signal should be set so that the phase difference $\Delta\phi_{RF}$ obtains a certain value as shown in Table 1. As seen from Equation (14), this phase difference depends on at least an angle of arrival of the incoming wireless signal and an operating wavelength of the incoming wireless signal. Thus, the spacing of (required distance between) the unit cells 410a and 410b can be said to be based at least in part on such an angle of arrival and operating wavelength. Furthermore, the required distance between the unit cells 410a and 410b is different depending on the relative phases of the cells' on-board local oscillators (i.e., whether they are in-phase or quadrature relative to one another). Put another way, the required distance depends at least in part on whether or not the unit cells 410a and 410b belong to a same subset of unit cells, this same subset being the previously described first subset or second subset. This is because the requirement for the phase difference $\Delta\phi_{RF}$ depending on such relative phases. It is also noted that, since unit cells having different phases of local oscillators are placed at different locations in the array (e.g. interleaved in a checkerboard pattern), the spacing of the unit cells may depend on an interrelated combination of the above factors (e.g. including angle of arrival, operating wavelength, relative phases of cells at given separation distances, etc.) As mentioned above, in various embodiments each unit cell is operable in a wireless signal AoA detector mode. Groups of four unit cells may cooperate in AoA detector mode to determine an angle of arrival of an incoming wireless signal. Groups of more than four unit cells can operate together in this mode, for example to provide for redundancy, averaging of detected AoAs, etc. The detected angle of arrival may be used to select the unit cells (configure their spacing) which cooperate to receive the incoming wireless signal (e.g. a QAM signal).

At least in the following embodiments, the groups of unit cells cooperating in AoA detector mode belong to a same subset, being the first subset or the second subset. That is, the cooperating unit cells all have a same phase of on-board local oscillator. Furthermore, in the following embodiments, the configuration of FIG. 1B is assumed, i.e. the checkerboard arrangement of unit cells. In this arrangement, the first subset of unit cells forms a first two-dimensional pattern of unit cells, and the second subset of unit cells forms a second two-dimensional pattern of unit cells. Furthermore, the first two-dimensional pattern and the second two-dimensional pattern are interleaved to form the checkerboard pattern within the two-dimensional array.

In such embodiments, the four unit cells (cooperating in AoA detector mode) form two parts of a zig-zag pattern within the overall checkerboard pattern. The zig-zag pattern facilitates that all four unit cells have the same phase of on-board local oscillator (and thus belong to a same subset being the first subset or the second subset). The two parts are symmetrically arranged about a reference cell which is separate from the four or more of the unit cells. This configuration is explained in more detail with reference to FIG. 5.

Figure 5:
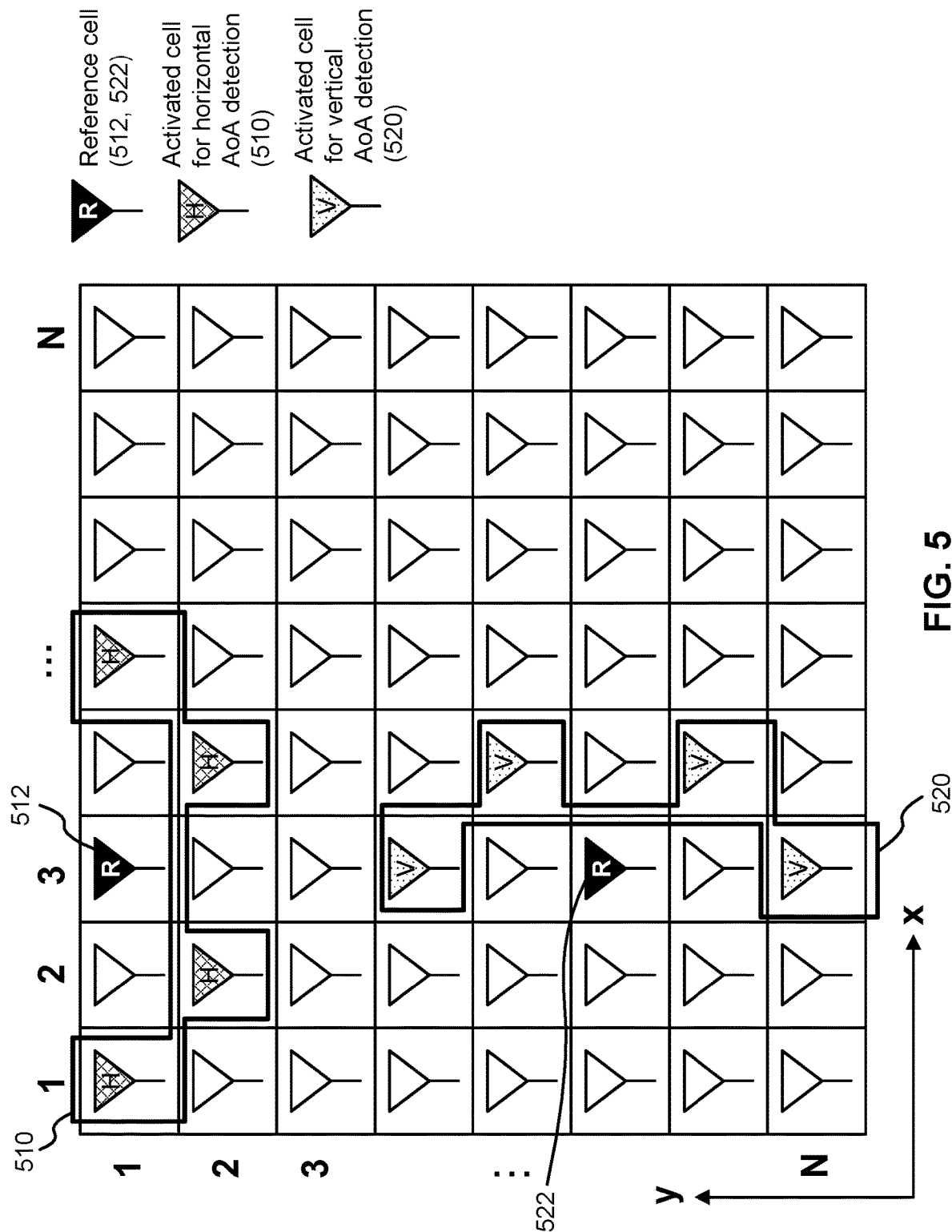
FIG. 5 illustrates patterns of unit cells cooperating in angle of arrival detection mode, according to embodiments of the present disclosure.

According to FIG. 5, two different example groups of four unit cells cooperating in AoA detector mode are shown. A first group 510 includes the unit cells in the first row, first column, second row, second column, second row, fourth column, and first row, fifth column. The reference cell 512 for this group is located in the first row, third column. A second, separate group 520 includes the unit cells in the (N-4$^{th}$) row, third column, (N-3$^{rd}$) row, fourth column, (N-1$^{st}$) row, fourth column, and N$^{th}$ row, third column. The reference cell 522 for this group is located in the (N-2$^{nd}$) row, third column. All locations are with respect to a rectangular array 110 as shown in FIGS. 1A and 1B. The two groups can be moved to any other location in the array. The reference cells can be used for other functions, e.g. other AoA detection, power harvesting, transmission or reception.

Each unit cell is again as illustrated in FIGS. 3 and 4. Hypothetically, if operating in the wireless receiver mode, the reference unit cell for a group would output a differential output signal according to Equation (13). The received wireless signals for each of the unit cells in the group of four will be phase shifted relative to the received wireless signal incident on the reference unit cell. These received wireless signals can be expressed as:

$$S_{RF,i}(t) = a_{RF} \alpha(t) e^{j(\omega t + \theta(t) + i\Delta\phi_{RF})} \quad (23)$$

Here, the index i denotes location of the unit cell relative to the reference cell. Index i=0 denotes that the unit cell is the reference cell; index i=+1 or i=−1 denotes that the unit cell is diagonally adjacent to the reference cell; and index i=+2 or i=−2 denotes that the unit cell is horizontally or vertically aligned with the reference cell, but separated therefrom by an intermediate cell. The sign on the index indicates which side of the reference cell the unit cell is on.

In view of the above, and following calculations similar to that of the wireless receiver mode, the output signals of the 90-degree hybrid coupler ports (at hybrid coupler port sides of the corresponding power detectors) of a given unit cell (having index i) can be expressed as:

$$\psi_{1,i}(t) = \frac{-a_{LO}}{\sqrt{2}} e^{j\omega t} \left[ j \frac{a_{RF}}{a_{LO}} \alpha(t) e^{j(\theta(t) + i\Delta\phi_{RF})} + 1 \right] \quad (24)$$

$$\psi_{2,i}(t) = \frac{-a_{LO}}{\sqrt{2}} e^{j\omega t} \left[ \frac{a_{RF}}{a_{LO}} \alpha(t) e^{j(\theta(t) + i\Delta\phi_{RF})} + j \right] \quad (25)$$

Consequently, the output voltages of the power detectors (at the IF port sides of the power detectors) can be expressed as:

$$V_{1,i}(t) = \frac{K a_{LO}^2}{2} \left[ 1 + \left(\frac{a_{RF}}{a_{LO}}\right)^2 \alpha^2(t) + 2\left(\frac{a_{RF}}{a_{LO}}\right) \alpha(t) \sin(\theta(t) + i\Delta\phi_{RF}) \right] \quad (26)$$

$$V_{2,i}(t) = \frac{K a_{LO}^2}{2} \left[ 1 + \left(\frac{a_{RF}}{a_{LO}}\right)^2 \alpha^2(t) - 2\left(\frac{a_{RF}}{a_{LO}}\right) \alpha(t) \sin(\theta(t) + i\Delta\phi_{RF}) \right] \quad (27)$$

Therefore, by subtracting the output voltages (e.g. using an operational amplifier as in the wireless receiver mode), each unit cell in the group can output a voltage signal of the form:

$$V_{D,i}(t) = 2K a_{LO} a_{RF} [\alpha(t) \sin(\theta(t) + i\Delta\phi_{RF})], i=-2,-1,1,2 \quad (28)$$

These voltage signals can be processed according to trigonometric operations, e.g. using a digital signal processor, or suitable analog or digital electronics, or the like. Accordingly, the following phase difference of RF signal between adjacent activated unit cells of the AoA detector group can be obtained as:

$$\Delta\phi_{RF} = \cos^{-1}\left(\frac{V_{D,+2} - V_{D,-2}}{2(V_{D,+1} - V_{D,-1})}\right) \quad (29)$$

Furthermore, the detected AoA in one direction can be obtained as:

$$AoA = \cos^{-1}\left(\frac{\lambda}{2\pi d} \cos^{-1}\left(\frac{V_{D,+2} - V_{D,-2}}{2(V_{D,+1} - V_{D,-1})}\right)\right) \quad (30)$$

To summarize the above, each of the unit cells cooperating in the AoA detector mode operates similarly to unit cells operating in the wireless receiver mode. Thus, each unit cell is configured to allow voltages at a hybrid coupler side of its pair of power detectors to fluctuate in response to the output of its local oscillator in combination with its received wireless signal. The combination is due to operation of the 90 degree hybrid coupler. Each unit cell is further configured to produce a respective intermediate frequency signal at the intermediate frequency signal port in response to combined output of the pair of power detectors at an intermediate frequency signal port side of the pair of power detectors, e.g. according to Equation (28). This output is in response to the fluctuation of voltages at the hybrid coupler side of the pair of power detectors. Next, outputs of the respective intermediate frequency signals of all four of the cooperating unit cells are combined, e.g. according to Equations (29) and (30) to provide an indication of the wireless signal angle of arrival.

Figure 6:
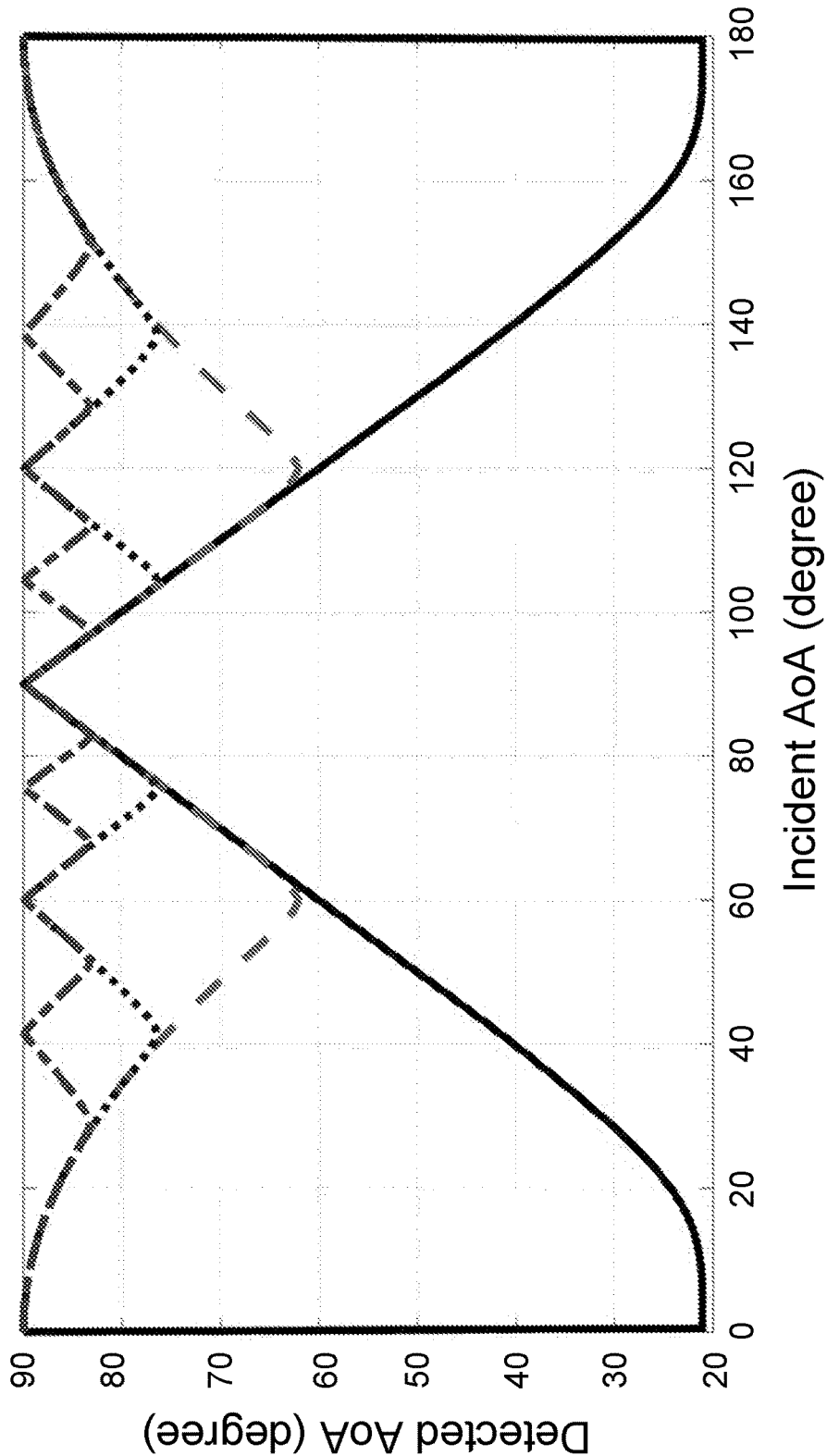
FIG. 6 illustrates performance of angle of arrival detection, according to an embodiment.

FIG. 6 illustrates simulation results of the detected AoA, based on Equation (30), for various incident angles of arrival. Results for different ratios of inter-element distances d to operating wavelengths λ are shown. As mentioned above, in various embodiments each unit cell is operable in a wireless energy power harvesting mode. In this mode, a unit cell converts wireless signal energy received at the antenna or antenna port into electrical energy which is then stored (e.g. in a battery) or used substantially immediately for powering electrical components of the apparatus or another apparatus. In some embodiments, cells which are not currently being operated in another mode can be operated (e.g. by default) in the wireless energy power harvesting mode.

In some embodiments, each of the unit cells includes at least one power detector (e.g. as shown in FIGS. 3 and 4), such as (or including) a zero-biased Schottky diode. In such embodiments, each of the unit cells, when operating in the wireless energy harvesting mode, is configured to switchably engage a low pass filter with an output of such a power detector, or set of power detectors. Then, output of the low pass filter is routed as harvested DC power to a power sink (e.g. electronics to be powered) or a power storage device, such as a battery. The harvested power can be provided at the IF signal port of the unit cell and routed to an appropriate destination. The low pass filter may remove harmonics, the IF signal components, or both. In some embodiments the low pass filter may be omitted or permanently (non-switchably) engaged.

In various embodiments, the power detectors, particularly when provided as zero-biased Schottky diodes, along with their associated matching circuitry, are capable of high-power handling. Furthermore, in various embodiments there is high isolation between the two ports of the hybrid coupler (e.g. 320) of the unit cells which are coupled to the antenna and on-board local oscillator, respectively. A low pass filter can be coupled to the power detector (or to each of the pair of power detectors in FIGS. 3 and 4) and configured to suppress high-order harmonics. This filtering facilitates harvesting of usable power with reduced noise component.

Figure 7:
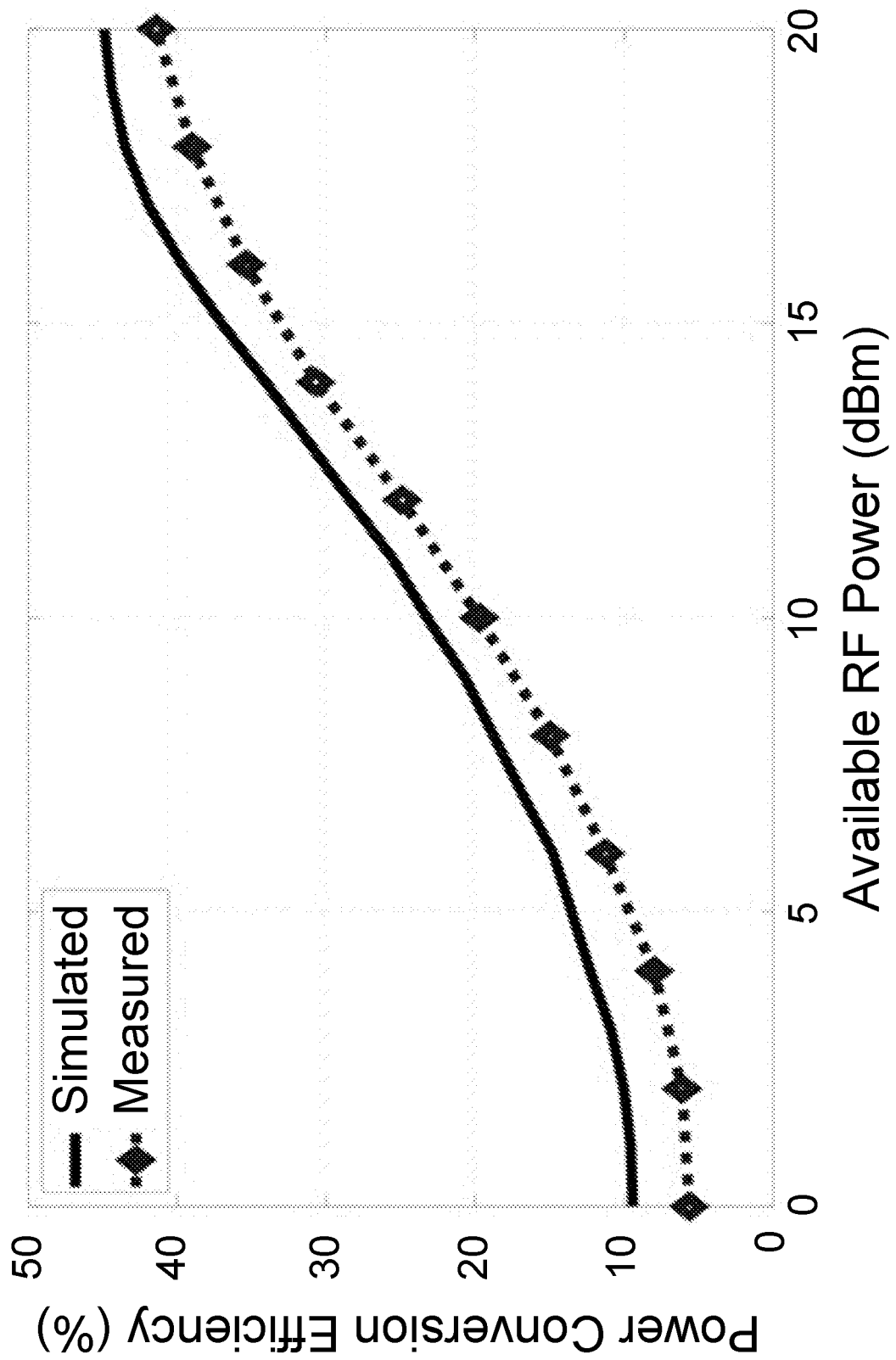
FIG. 7 illustrates power conversion efficiency for unit cells operating in a wireless energy power harvesting mode, according to embodiments of the present disclosure.
Figure 8:
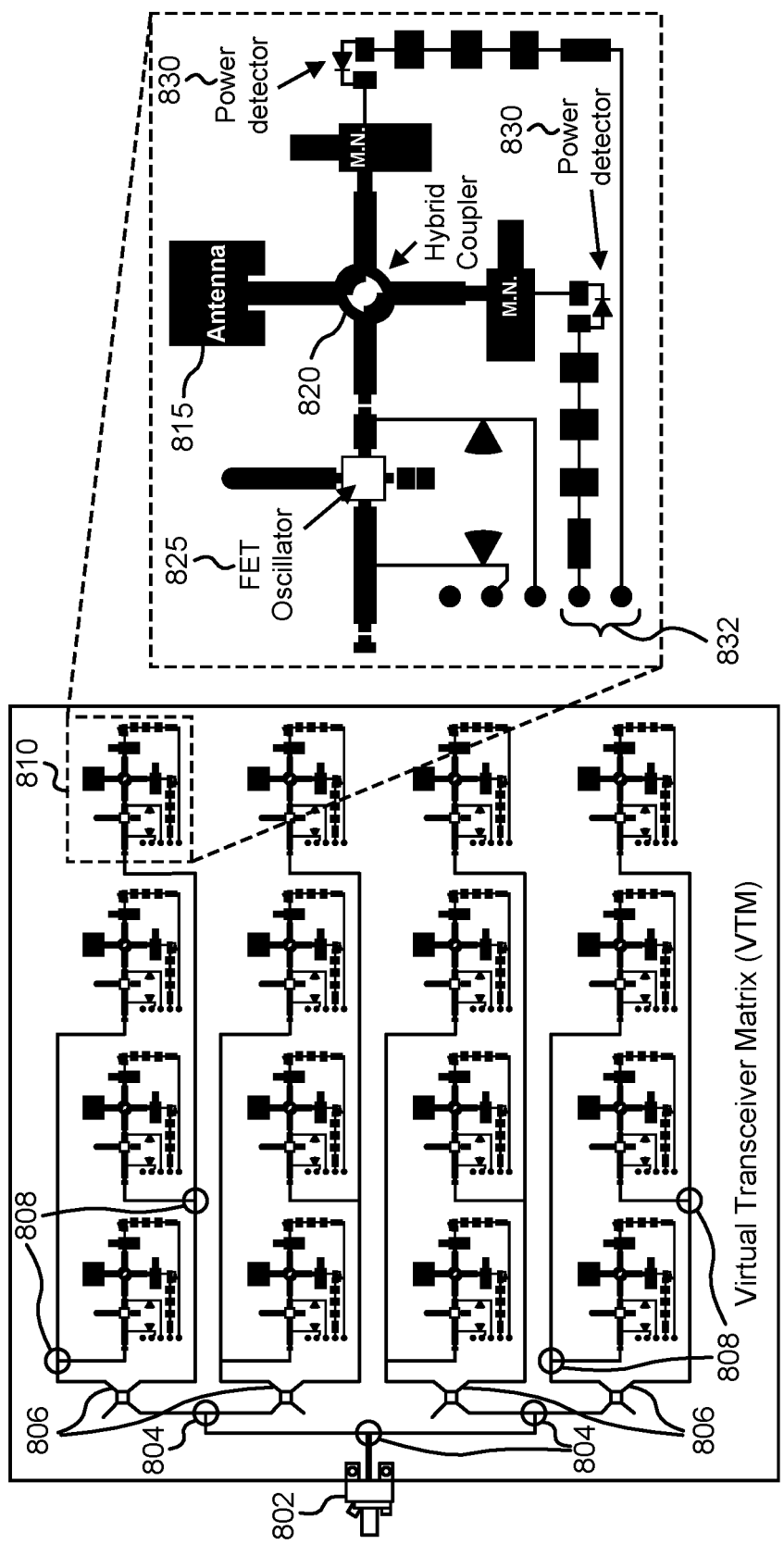
FIG. 8 illustrates a physical layout for a virtual transceiver matrix apparatus, according to embodiments of the present disclosure.

FIG. 7 illustrates simulated and measured efficiency of wireless signal power to DC power conversion, according to an embodiment involving a unit cell as shown in FIGS. 3 and 4. FIG. 8 illustrates an implementation of an apparatus according to embodiments of the present disclosure. The apparatus includes a two-dimensional rectangular array of unit cells and a reference frequency distribution component. The reference frequency distribution component includes an input 802 for receiving a reference frequency signal and a first plurality of junctions 804 configured to divide the reference frequency signal into four substantially equal portions, in accordance with a power divider operation. The reference frequency distribution component further includes four 90 degree hybrid couplers 806 each configured to receive one of the reference frequency signal portions and to generate an in-phase version of the reference frequency signal and a quadrature version of the reference frequency signal. The in-phase version of the reference frequency signal is substantially similar to the reference frequency as provided at the input 802 without any phase shift. The quadrature version of the reference frequency signal is substantially similar to the reference frequency as provided at the input 802 but with 90 degrees of relative phase shift. Each in-phase and quadrature version of reference frequency signal is further divided via junctions 808 so that it is provided to two unit cells. According to this arrangement, in-phase versions of the reference frequency signal are provided to a first subset of unit cells and quadrature versions of the reference frequency signal are provided to a second subset of unit cells. The first subset includes (counting cells from left to right and rows from top to bottom) the second and fourth unit cells in the first and third rows, and the first and third unit cells in the second and fourth rows. Thus, the first and second subsets are interleaved according to a checkerboard pattern.

The layout of each unit cell 810 is also illustrated. Each unit cell includes an antenna 815, a 90 degree hybrid coupler 820, an on-board local FET oscillator 825, and a pair of power detectors 830. Also illustrated are matching networks 832 interposed between the hybrid coupler 820 and the power detectors 830. An intermediate frequency (IF) signal port 835 is also shown.

The apparatus of FIG. 8 was constructed and tested. The apparatus was fabricated on Rogers RO4350 substrate with $\varepsilon_r$=3.48 and thickness of 20 mils to operate at 28 GHz for 5G mmW systems. A full-wave simulator of CST and Keysight™ Advanced Design System (ADS) software were used to design, simulate, and optimize the apparatus. Each unit-cell included a fed-through microstrip antenna to receive and transmit QAM signals, a hybrid coupler, an oscillator using CE3520K3-C1 RF FET transistor, and two power detectors using zero biased Schottky diode SMS 7630-040LF. A matching network before the power detectors was provided to facilitate detectable output voltage levels, and a low pass filter after the power detector was provided for power harvesting purposes. It is also noted here that the present invention can also be provided via an integrated circuit (IC) chip implementation, for example for large-scale THz transceiver arrays.

Figure 9:
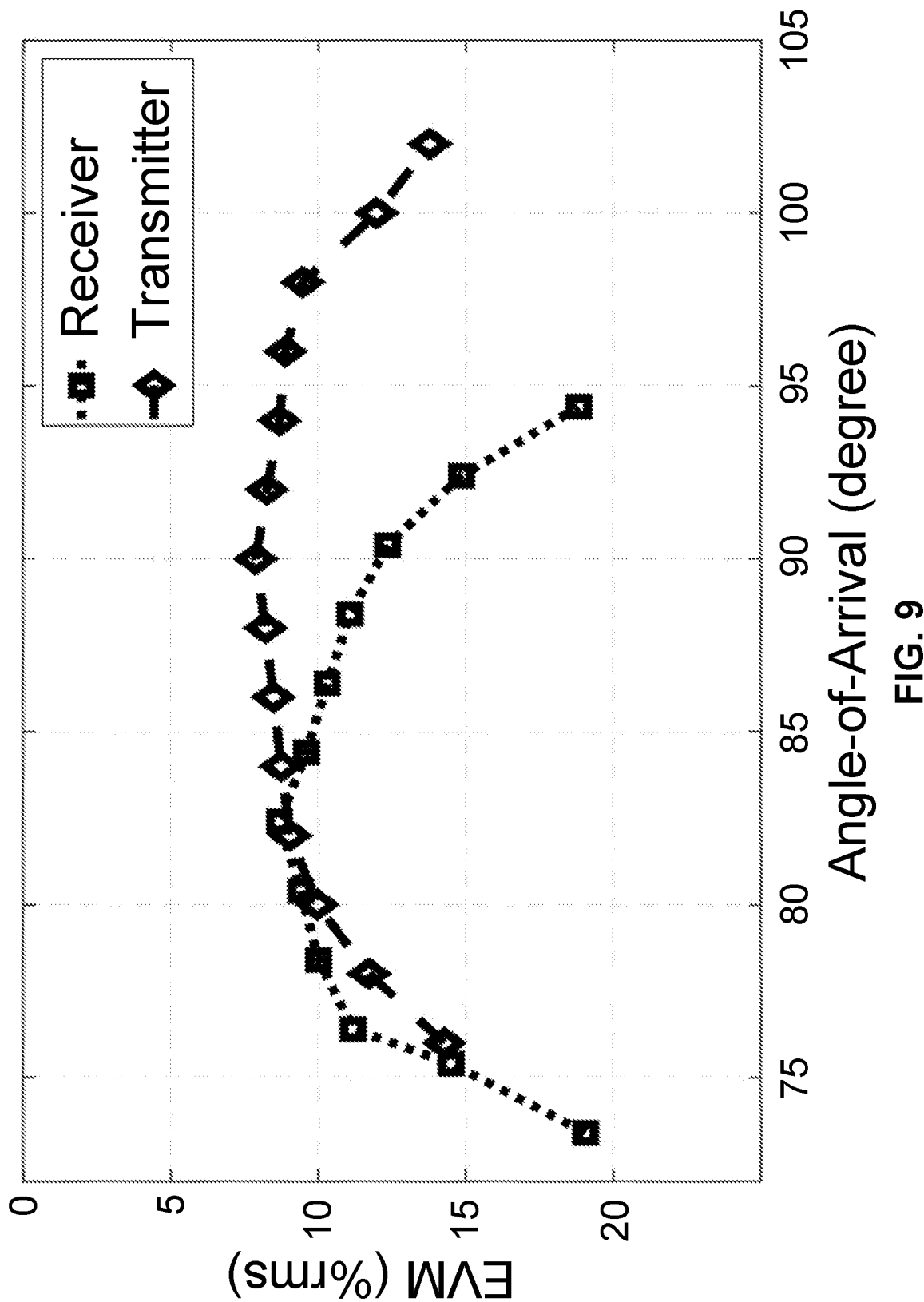
FIG. 9 illustrates aspects of transmitter and receiver performance for the virtual transceiver matrix apparatus of FIG. 8, according to embodiments of the present disclosure.
Figure 10A:
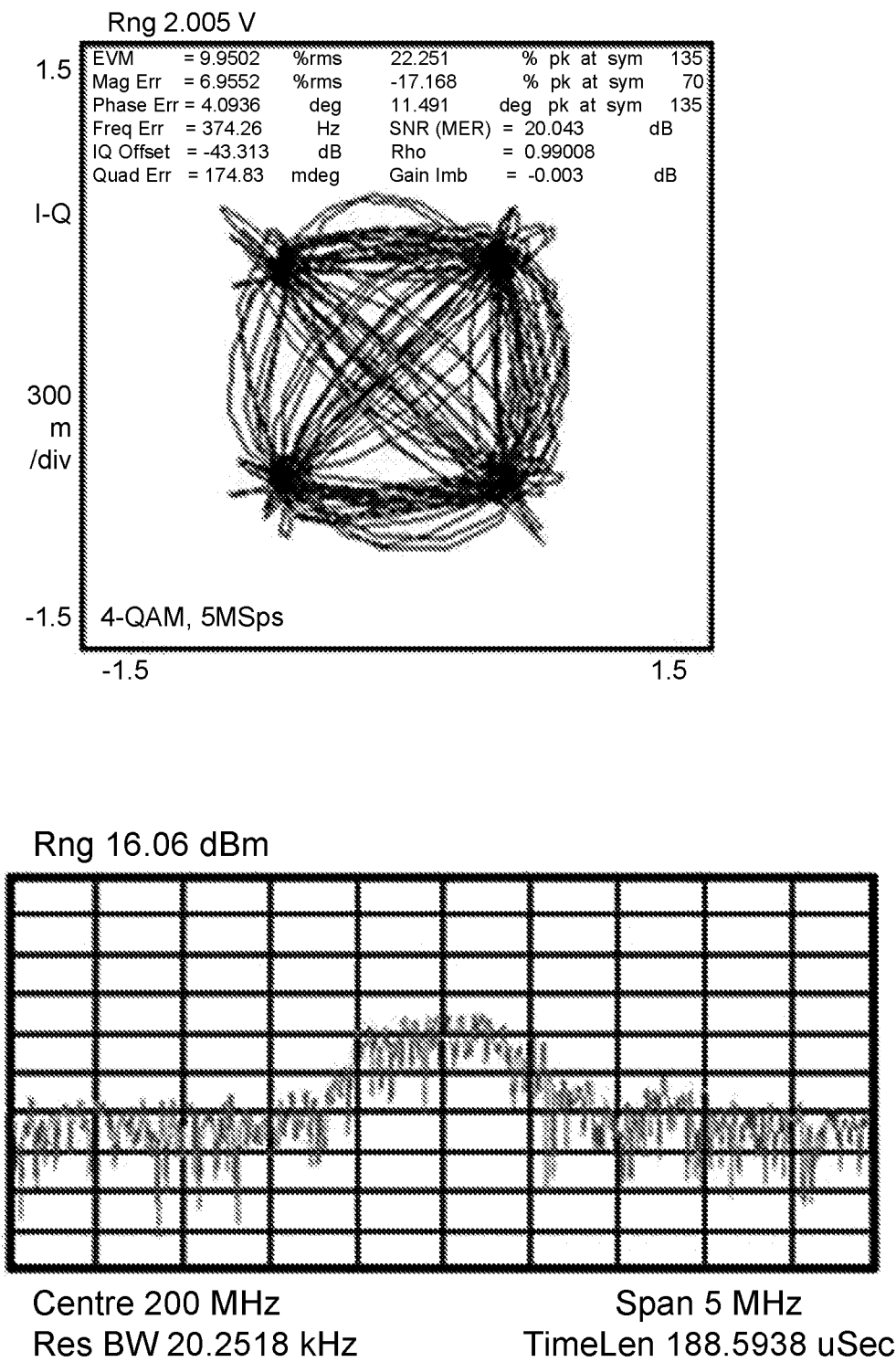
FIGS. 10A to 10D illustrate further aspects of transmitter and receiver performance for the virtual transceiver matrix apparatus of FIG. 8, according to embodiments of the present disclosure.
Figure 10B:
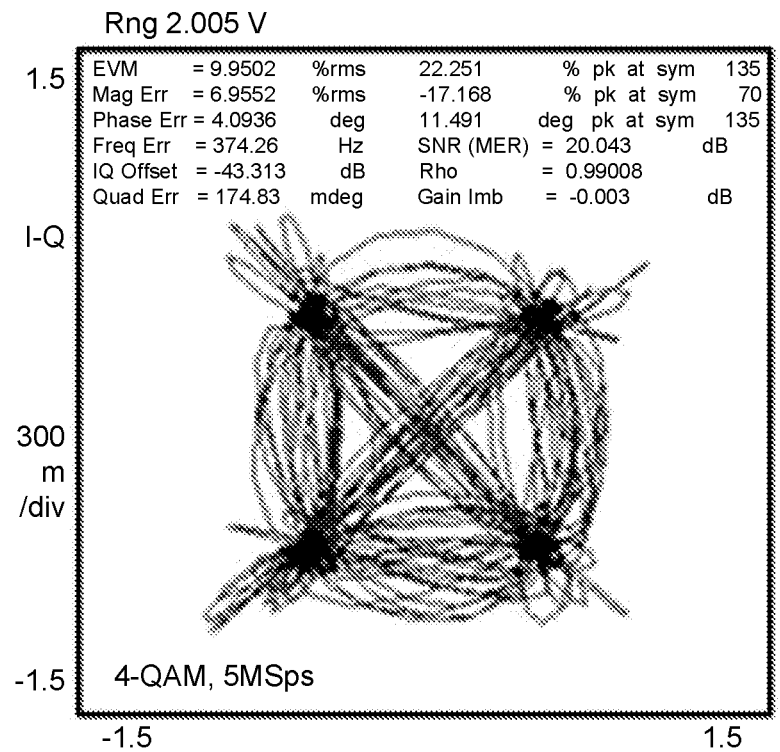
Figure 10B:
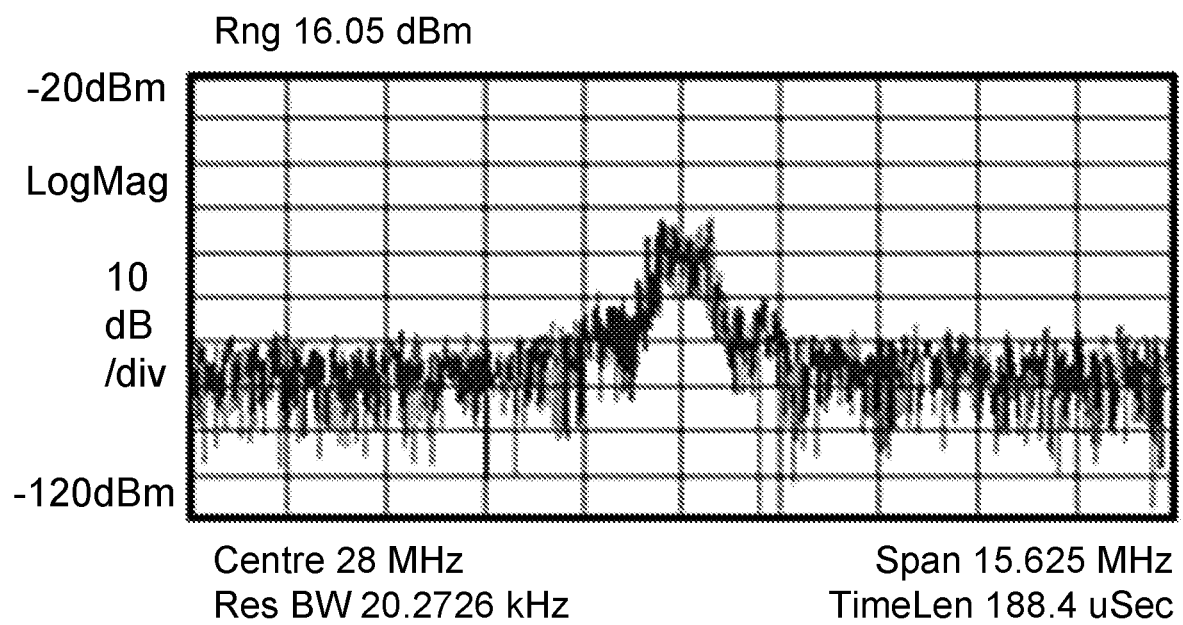
Figure 10C:
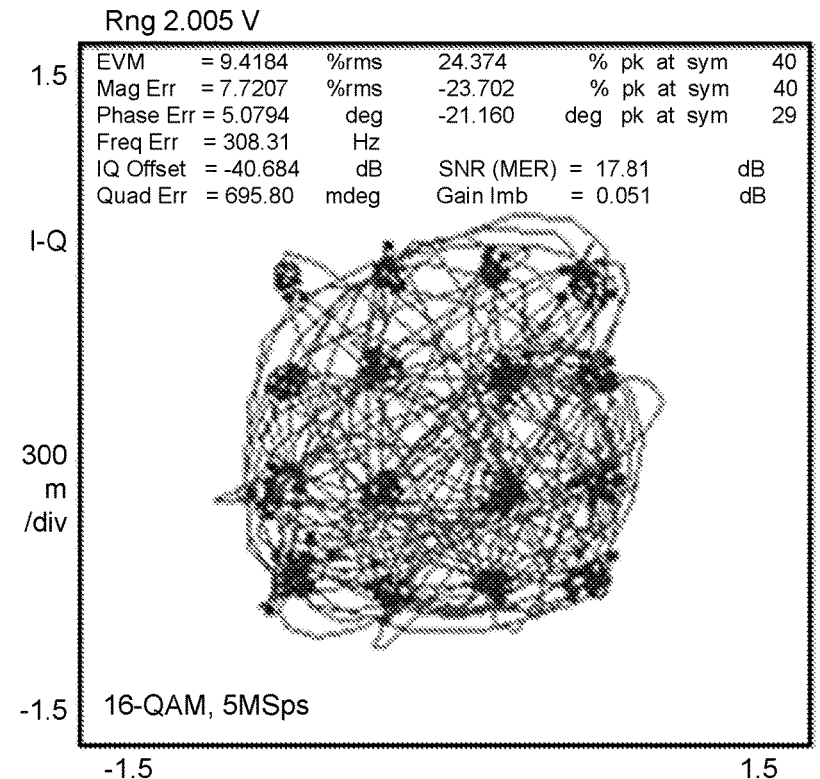
Figure 10C:
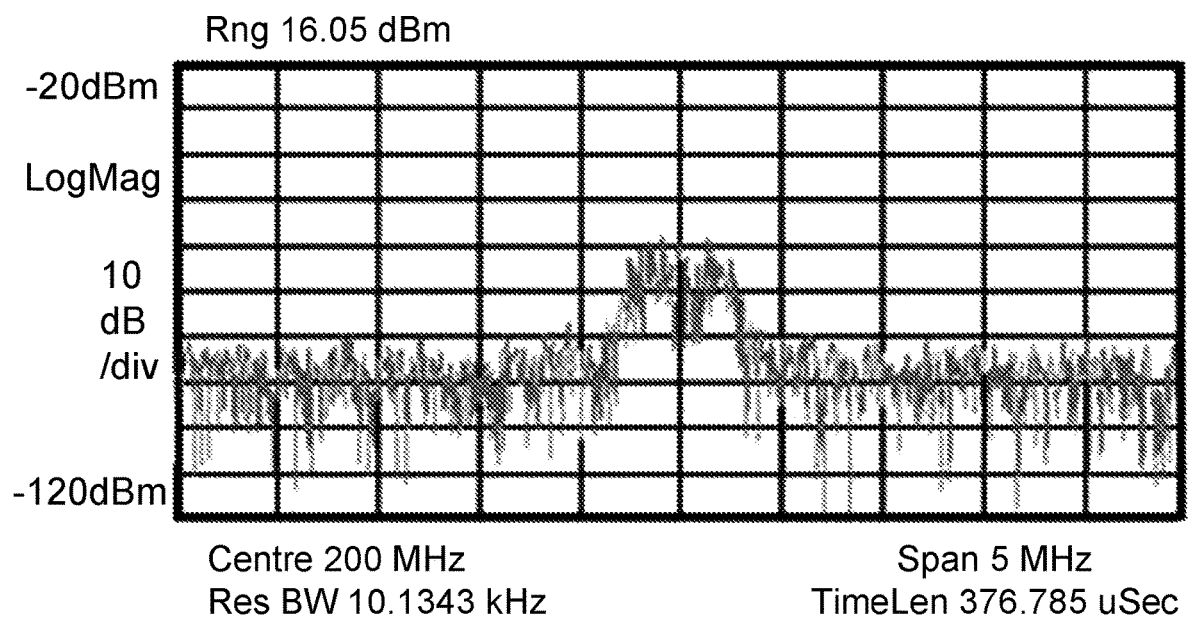
Figure 10D:
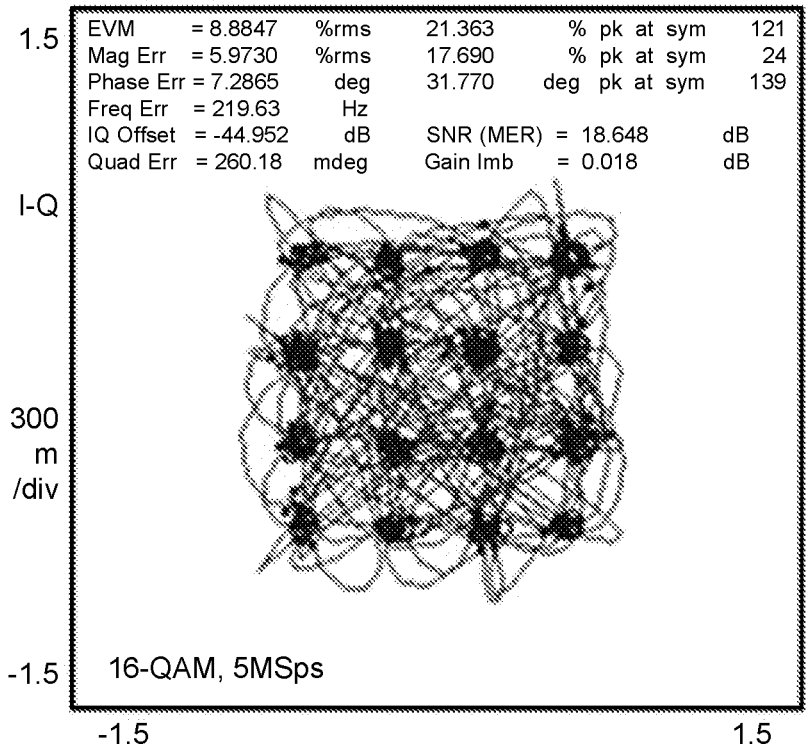
Figure 10D:
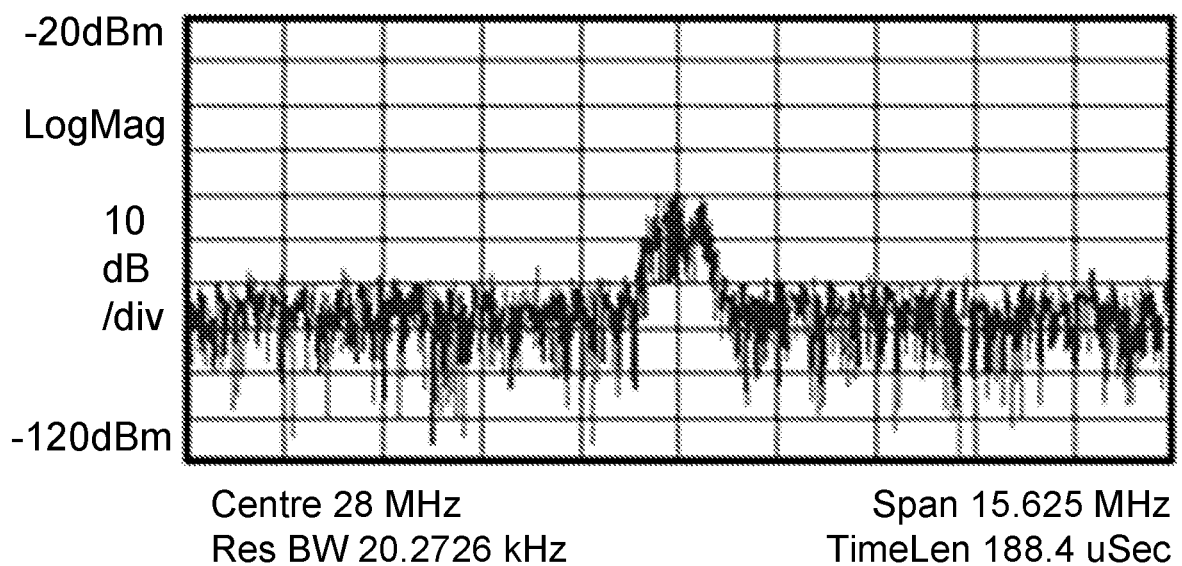

Operations of the apparatus of FIG. 8 were measured using a Keysight™ UXR0702AP Real-Time Oscilloscope, an Agilent™ E8257D PSG Analog Signal Generator, an Agilent™ E8267D Vector Signal Generator, and an Agilent™ N1914A power meter. To synchronize the wireless (radiofrequency) and reference local oscillator (LO) signals, a 10 MHz synchronization signal was applied to both signal generators and analyzers. The fabricated prototype was mounted on a rotational platform displaying the rotated degrees. Numerous combinations of unit-cells can be used to form a virtual transceiver channel. For the measurement results, an arbitrary combination of two cells is considered for receiving and another two cells are set to transmit QAM signals with different modulation orders at a data rate of 5 MSps. As can be seen in FIGS. 10A to 10D, an extracted error vector magnitude (EVM) of less than 10% was achieved for all the cases of receiving and transmitting functions. Also, the spectrum of received and transmitted QAM signals are illustrated in FIG. 10. FIG. 9 illustrates the EVM variations versus changing AoA for both receiving and transmitting functions. As can be observed, the transmitting operation is less sensitive to the AoA as the antennas of the apparatus radiate in omni-directional pattern, while for the receiving function, the phase shift requirements may require more accurate consideration.

It noted that embodiments of the present invention may be utilized for example as part of large-scale THz communication systems, particularly for compact range and line-of-sight scenarios. It is also noted that in some embodiments, the transmitter mode can be combined with the AoA detection mode, the receiver mode, or both, to provide for a radar functionality. Different unit cells can concurrently operate in different ones of these mode to provide for the radar functionality.

Embodiments of the present disclosure are not necessarily limited to the block diagram configurations as disclosed herein. Each unit cell can be designed based on given requirements. For instance, instead of using two unit-cells to provide for a full transceiver as described herein, it is possible to redesign the unit cells so that a transceiver may be provided using three or more units. In this regard, the total number of possible virtual transceivers would change accordingly.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An apparatus comprising:
 a plurality of unit cells arranged in a two-dimensional array, each of the unit cells having an antenna or an antenna port and being selectably reconfigurable to operate in one of a plurality of modes including: a wireless transmitter mode; and a wireless receiver mode; and
 a reference frequency distribution component configured to distribute an electrical reference frequency signal to each of the unit cells, such that an in-phase version of the reference frequency signal is delivered to a first subset of the plurality of unit cells, and a quadrature version of the reference frequency signal is delivered to a second subset of the plurality of unit cells, the first subset and the second subset making up the plurality of unit cells,
 wherein each one of the unit cells belonging to the first subset and operating in the wireless transmitter mode cooperates with at least another one of the unit cells belonging to the second subset and operating in the wireless transmitter mode to transmit an outgoing wireless signal; and
 wherein each one of the unit cells operating in the wireless receiver mode cooperates with at least another one of the unit cells operating in the wireless receiver mode to receive an incoming wireless signal.

2. The apparatus of claim 1, wherein the plurality of modes further includes:
 a wireless signal angle of arrival detector mode, wherein four or more of the unit cells operating in the wireless signal angle of arrival detector mode and belonging to a same one of the first subset and the second subset cooperate to determine a wireless signal angle of arrival; and a wireless energy power harvesting mode, wherein unit cells operating in the wireless energy power harvesting mode convert received wireless signal energy at the antenna or antenna port into electrical energy usable for powering electrical components.

3. The apparatus of claim 2, wherein the first subset forms a first two-dimensional pattern of unit cells, the second subset forms a second two-dimensional pattern of unit cells, and the first two-dimensional pattern and the second two-dimensional pattern are interleaved to form a checkerboard pattern within the two-dimensional array, and wherein the four or more of the unit cells operating in the wireless signal angle of arrival detector mode form two parts of a zig-zag pattern within the checkerboard pattern, the two parts being symmetrically arranged about a reference cell separate from the four or more of the unit cells.

4. The apparatus of claim 2, wherein each of the unit cells comprises at least one power detector, and wherein each of the unit cells, when operating in the wireless energy harvesting mode, is configured to switchably engage a low pass filter with an output of said at least one power detector, wherein output of the low pass filter is routed as harvested power to a power sink or a power storage device.

5. The apparatus of claim 1, further comprising a controller configured to allocate one or more groups of the plurality of unit cells to one or more corresponding transmission or reception tasks, and to configure unit cells of each of the groups to perform said corresponding transmission or reception tasks.

6. The apparatus of claim 5, wherein, for at least one of the groups, the controller determines a number of cells forming said at least one of the groups based on one or more of: a power consumption criterion; a performance criterion for a wireless transmission operation; and a performance criterion for a wireless reception operation.

7. The apparatus of claim 5, wherein the controller determines a pattern of cells forming at least one of the groups based on one or more of: a polarization of the outgoing wireless signal or the incoming wireless signal; a frequency of the outgoing wireless signal or the incoming wireless signal; a direction for transmission of the outgoing wireless signal; and an angle of arrival of the incoming wireless signal.

8. The apparatus of claim 7, wherein the plurality of modes further includes a wireless signal angle of arrival detector mode, and wherein the angle of arrival of the incoming wireless signal is determined using the wireless signal angle of arrival detector mode operating prior to the controller determining the pattern of cells.

9. The apparatus of claim 1, wherein the reference frequency distribution component comprises:
one or more 90 degree hybrid couplers, each of the 90 degree hybrid couplers configured to receive the reference frequency signal and to generate a copy of the in-phase version of the reference frequency signal and a copy of the quadrature version of the reference frequency signal,
the reference frequency distribution component further configured to provide each of the unit cells of the first subset with one of the in-phase versions of the reference frequency signal, and to provide each of the unit cells of the second subset with one of the quadrature versions of the reference frequency signal.

10. The apparatus of claim 9, wherein the one or more 90 degree hybrid couplers comprises multiple 90 degree hybrid couplers, the apparatus further comprising a power divider configured to distribute the reference frequency signal to the multiple 90 degree hybrid couplers.

11. The apparatus of claim 1, wherein each one of the unit cells belonging to the first subset is adjacent to at least one of the unit cells belonging to the second subset.

12. The apparatus of claim 1, wherein the first subset forms a first two-dimensional pattern of unit cells, the second subset forms a second two-dimensional pattern of unit cells, and the first two-dimensional pattern and the second two-dimensional pattern are interleaved to form an overall pattern within the two-dimensional array.

13. The apparatus of claim 12, wherein the overall pattern is a checkerboard pattern.

14. The apparatus of claim 1, wherein the outgoing wireless signal is a quadrature amplitude modulated signal, said one of the unit cells belonging to the first subset and operating in the wireless transmitter mode transmits an in-phase portion of the quadrature amplitude modulated signal, and said another one of the unit cells belonging to the second subset and operating in the wireless transmitter mode transmits a quadrature portion of the quadrature amplitude modulated signal.

15. The apparatus of claim 14, wherein said one of the unit cells is physically adjacent to said another one of the unit cells within the two-dimensional array.

16. The apparatus of claim 1, wherein the incoming wireless signal is a quadrature amplitude modulated signal, said one of the unit cells operating in the wireless receiver provides an intermediate signal indicative of an in-phase portion of the quadrature amplitude modulated signal, and said another of the unit cells operating in the wireless receiver mode provides an intermediate signal indicative of a quadrature portion of the quadrature amplitude modulated signal.

17. The apparatus of claim 16, wherein said one of the unit cells is spaced apart from said another one of the unit cells by a distance which depends at least in part on whether or not said one of the unit cells and said another one of the unit cells belong to a same subset, being one of the first subset and the second subset.

18. The apparatus of claim 1,
wherein each cell of the plurality of unit cells comprises:
a local oscillator synchronized to the reference frequency signal as received by the cell;
an antenna or antenna port, the antenna for transmitting or receiving a wireless signal;
an intermediate frequency signal port for providing, to the cell, an intermediate frequency signal for use in generating the outgoing wireless signal for transmission or for outputting the intermediate frequency signal as derived from the incoming wireless signal;
a pair of power detectors operatively coupled to the intermediate frequency signal port; and
a 90 degree hybrid coupler having:
a first terminal and a second terminal each coupled to one of the pair of power detectors such that the power detectors are coupled between the intermediate frequency signal port and the 90 degree hybrid coupler, the first terminal and the second terminal being out of phase with respect to one another;
a third terminal coupled to the local oscillator; and
a fourth terminal coupled to the antenna or the antenna port.

19. The apparatus of claim 18, wherein the plurality of modes further includes:
- a wireless signal angle of arrival detector mode, wherein four of the unit cells operating in the wireless signal angle of arrival detector mode and belonging to a same one of the first subset and the second subset cooperate to determine a wireless signal angle of arrival;
- each of said four of the unit cells is configured to:
  - allow voltages at a hybrid coupler side of the pair of power detectors to fluctuate in response to the output of the local oscillator in combination with the received wireless signal, the combination being due to operation of the 90 degree hybrid coupler; and
  - produce a respective intermediate frequency signal at the intermediate frequency signal port in response to combined output of the pair of power detectors at an intermediate frequency signal port side of the pair of power detectors, said output being in response to said fluctuation of voltages at the hybrid coupler side of the pair of power detectors; and
- outputs of the respective intermediate frequency signals of said four of the unit cells are combined to provide an indication of the wireless signal angle of arrival.

20. A method comprising, by an electronic controller:
- operating the apparatus according to claim 1, said operating comprising:
  - selecting groups of the plurality of unit cells, each one of the groups being selected to operate in a respective one of the plurality of modes; and
  - causing said selected groups to operate in said respective one of the plurality of modes.

* * * * *

UNITED STATES PATENT AND TRADEMARK OFFICE
CERTIFICATE OF CORRECTION

PATENT NO. : 12,368,494 B2
APPLICATION NO. : 18/390681
DATED : July 22, 2025
INVENTOR(S) : Seyed Ali Keivaan et al.

It is certified that error appears in the above-identified patent and that said Letters Patent is hereby corrected as shown below:

In the Specification

Column 14, Line 40:
"$S_{LO}' = ja_{LO}e^{j\omega t}$ (4)"
Should read:
-- $S'_{LO} = ja_{LO}e^{j\omega t}$ (4) --

Column 14, Line 48:
"$S_{RF.Q}(t) = jKar_{LO}[\Gamma_3(t) + \Gamma_4(t)]e^{j\omega t}$ (5)"
Should read:
-- $S_{RF.Q}(t) = jKa_{LO}[\Gamma_3(t) + \Gamma_4(t)]e^{j\omega t}$ (5) --

Column 16, Line 64:
"$S_{RF}'(t) = a_{RF}\alpha(t)e^{j(\omega t + \theta(t))} \cdot e^{j\Delta\phi_{RF}}$   (15)"
Should read:
-- $S'_{RF}(t) = a_{RF}\alpha(t)e^{j(\omega t + \theta(t))} \cdot e^{j\Delta\phi_{RF}}$   (15) --

Column 17, Line 4:
"$S_{LO}'(t) = ja_{LO}e^{j\omega t}$ (16)"
Should read:
-- $S'_{LO}(t) = ja_{LO}e^{j\omega t}$ (16) --

Signed and Sealed this
Twenty-third Day of December, 2025

John A. Squires
*Director of the United States Patent and Trademark Office*

CERTIFICATE OF CORRECTION (continued)
U.S. Pat. No. 12,368,494 B2

Column 17, Line 36:
"V$_D$'(t) = V$_1$'(t) − V$_2$'(t) = 2Ka$_{LO}$a$_{RF}$[a(t) cos(θ(t) + Δϕ$_{RF}$)] (21)"
Should read:

$$\text{--} V'_D(t) = V'_1(t) - V'_2(t) = 2Ka_{LO}a_{RF}\left[\alpha(t)\cos\bigl(\theta(t) + \Delta\phi_{RF}\bigr)\right] \quad (21) \text{--}$$

Column 17, Line 40:
"V$_D$'(t) = I(t) = 2Ka$_{LO}$a$_{RF}$[a(t)cos (θ(t)] (22)"
Should read:

$$\text{--} V'_D(t) = I(t) = 2Ka_{LO}a_{RF}\left[\alpha(t)\cos\bigl(\theta(t)\bigr)\right] \quad (22) \text{--}$$